United States Patent
Löthman et al.

(10) Patent No.: US 12,169,799 B2
(45) Date of Patent: Dec. 17, 2024

(54) RENTAL VEHICLE SYSTEM OPTIMIZATION

(71) Applicant: Volvo Car Corporation, Gothenburg (SE)

(72) Inventors: Mikael Löthman, Stockholm (SE); Henrik Strååth, Stockholm (SE)

(73) Assignee: Volvo Car Corporation, Gothenburg (SE)

( * ) Notice: Subject to any disclaimer, the term of this patent is extended or adjusted under 35 U.S.C. 154(b) by 568 days.

(21) Appl. No.: 17/204,371

(22) Filed: Mar. 17, 2021

(65) Prior Publication Data
US 2022/0301044 A1    Sep. 22, 2022

Related U.S. Application Data

(63) Continuation of application No. 17/204,023, filed on Mar. 17, 2021.

(51) Int. Cl.
*G06Q 10/0631*    (2023.01)
*B60L 53/62*    (2019.01)
(Continued)

(52) U.S. Cl.
CPC ........ *G06Q 10/06312* (2013.01); *B60L 53/62* (2019.02); *G06F 3/0488* (2013.01);
(Continued)

(58) Field of Classification Search
CPC ............................ G06Q 10/02; G06Q 30/0645
See application file for complete search history.

(56) References Cited

U.S. PATENT DOCUMENTS

| 8,862,488 B2 | 10/2014 | Stephens et al. |
| 8,981,717 B2 | 3/2015 | Hayashi et al. |

(Continued)

FOREIGN PATENT DOCUMENTS

| CN | 106157459 A | 11/2016 |
| CN | 111275418 A | 6/2020 |

(Continued)

OTHER PUBLICATIONS

George F. Savari, Internet of Things based real-time electric vehicle load forecasting and charging station recommendation, 2020, p. 431-436 (Year: 2020).*

(Continued)

*Primary Examiner* — Ibrahim N El-Bathy
(74) *Attorney, Agent, or Firm* — Amin, Turocy & Watson, LLP

(57) ABSTRACT

Techniques are described for optimizing various aspects of rental vehicle systems. According to an embodiment, a system is described for optimizing fleet utilization of a battery electric vehicle (BEV) rental system based on predicted charge levels. The system comprises a memory that stores computer executable components, and a processor that executes the computer executable components stored in the memory. These computer executable components comprise a charge prediction component that determines forecasted charge levels of BEVs in association with usage of the BEVs in a vehicle sharing operation wherein the BEVs are available for renting for varying durations of time. The computer executable components further comprise a booking component that controls the renting of the BEVs based on the forecasted charge levels.

20 Claims, 23 Drawing Sheets

(51) Int. Cl.
  *B60L 58/12* (2019.01)
  *G06F 3/0488* (2022.01)
  *G06F 16/2457* (2019.01)
  *G06N 5/04* (2023.01)
  *G06N 20/00* (2019.01)
  *G06Q 10/02* (2012.01)
  *G06Q 30/0601* (2023.01)
  *G06Q 30/0645* (2023.01)

(52) U.S. Cl.
  CPC ......... *G06F 16/24575* (2019.01); *G06N 5/04* (2013.01); *G06N 20/00* (2019.01); *G06Q 10/02* (2013.01); *G06Q 10/06315* (2013.01); *G06Q 30/0631* (2013.01); *G06Q 30/0645* (2013.01); *B60L 58/12* (2019.02)

(56) References Cited

U.S. PATENT DOCUMENTS

| | | |
|---|---|---|
| 9,104,537 B1 | 8/2015 | Penilla et al. |
| 9,153,991 B2 | 10/2015 | Chaturvedi et al. |
| 9,377,319 B2 | 6/2016 | San Filippo et al. |
| 9,457,682 B2 | 10/2016 | Twarog et al. |
| 9,499,128 B2 | 11/2016 | Reh et al. |
| 10,170,924 B2 | 1/2019 | Katsuki et al. |
| 10,417,585 B2 | 9/2019 | Barrois et al. |
| 10,861,066 B2 | 12/2020 | Khoo et al. |
| 11,460,310 B1 | 10/2022 | Kelly et al. |
| 2004/0073440 A1 | 4/2004 | Garbers et al. |
| 2013/0246102 A1 | 9/2013 | Finegold et al. |
| 2015/0161543 A1 | 6/2015 | Kadir et al. |
| 2016/0027307 A1 | 1/2016 | Abhyanker et al. |
| 2016/0042445 A1 | 2/2016 | Beason |
| 2016/0364783 A1 | 12/2016 | Ramanuja et al. |
| 2017/0206475 A1 | 7/2017 | Shoen et al. |
| 2017/0352093 A1 | 12/2017 | Armelin et al. |
| 2018/0017401 A1 | 1/2018 | Fletcher |
| 2018/0209808 A1 | 7/2018 | Wang et al. |
| 2018/0238698 A1 | 8/2018 | Pedersen |
| 2019/0026658 A1 | 1/2019 | Altus et al. |
| 2019/0035282 A1 | 1/2019 | Ferguson et al. |
| 2019/0244283 A1 | 8/2019 | Umeda et al. |
| 2019/0340543 A1 | 11/2019 | Gerenstein et al. |
| 2019/0370701 A1 | 12/2019 | Scaria et al. |
| 2020/0258018 A1 | 8/2020 | Brady |
| 2020/0331433 A1 | 10/2020 | Johnson et al. |
| 2020/0333148 A1 | 10/2020 | Qiu et al. |
| 2021/0272036 A1 | 9/2021 | Conroy et al. |
| 2021/0350307 A1 | 11/2021 | Price et al. |
| 2021/0389137 A1 | 12/2021 | Haban |
| 2022/0074758 A1 | 3/2022 | Sameer |
| 2022/0101161 A1 | 3/2022 | Goel et al. |
| 2022/0107194 A1* | 4/2022 | Hagström .......... G01C 21/3697 |
| 2022/0108235 A1* | 4/2022 | Schulz ................ G06Q 10/025 |
| 2022/0114506 A1* | 4/2022 | Villa ..................... G06Q 10/20 |
| 2022/0114637 A1 | 4/2022 | Bersia |
| 2022/0172129 A1* | 6/2022 | Hou ....................... G06Q 10/02 |
| 2023/0305587 A1* | 9/2023 | Thirumurthy ........... H02J 3/144 |

FOREIGN PATENT DOCUMENTS

| | | |
|---|---|---|
| CN | 111489002 A | 8/2020 |
| CN | 111612358 A | 9/2020 |
| CN | 112184395 A | 1/2021 |
| JP | 2005308460 A | 11/2005 |
| JP | 2009301150 A | 12/2009 |
| KR | 100951665 B1 | 4/2010 |
| KR | 20150082737 A | 7/2015 |
| WO | 03/091856 A2 | 11/2003 |
| WO | 2016000501 A1 | 1/2016 |
| WO | 2016023435 A1 | 2/2016 |

OTHER PUBLICATIONS

Non-Final Office Action received for U.S. Appl. No. 17/204,023, dated May 9, 2023, 54 pages.

Hu et al., "Modeling Users' Vehicles Selection Behavior in The Urban Carsharing Program", IEEE, Nov. 4-7, 2018, 6 pages.

Final Office Action received for U.S. Appl. No. 17/204,023 dated Dec. 1, 2023, 58 pages.

Ravi et al., "A Collaborative Location Based Travel Recommendation System through Enhanced Rating Prediction for the Group of Users", Computational Intelligence and Neuroscience, vol. 2016, Article ID 1291358, 2016, 28 pages.

Non-Final Office Action received for U.S. Appl. No. 17/204,377 dated Oct. 5, 2023, 54 pages.

Alabdulkarim, Abdullah A., "Simulating Different Levels of Car Class Upgrades In a Car Rental Company's Operations", Proceedings of the 2018 Winter Simulation Conference, IEEE, 2018, pp. 1539-1550.

Non-Final Office Action received for U.S. Appl. No. 17/204,386 dated Sep. 25, 2023, 90 pages.

Non-Final Office Action received for U.S. Appl. No. 17/204,023 dated Mar. 13, 2024, 86 pages.

Non-Final Office Action received for U.S. Appl. No. 17/204,364 dated Jan. 3, 2024, 67 pages.

Final Office Action received for U.S. Appl. No. 17/204,386 dated Mar. 27, 2024, 58 pages.

Final Office Action received for U.S. Appl. No. 17/204,377 dated Ape. 25, 2024, 48 pages.

Advisory Action received for U.S. Appl. No. 17/204,386 dated Jun. 5, 2024, 5 pages.

Non-Final Office Action received for U.S. Appl. No. 17/204,386 dated Jul. 17, 2024, 74 pages.

Final Office Action received for U.S. Appl. No. 17/204,364 dated Jun. 25, 2024, 72 pages.

Notice of Allowance received for U.S. Appl. No. 17/204,364 dated Sep. 18, 2024, 132 pages.

Dandl et al., "Comparing Future Autonomous Electric Taxis With an Existing Free-Floating Carsharing System", IEEE Transactions on Intelligent Transportation Systems, vol. 20, No. 6, Jun. 2019, pp. 2037-2047.

Final Office Action received for U.S. Appl. No. 17/204,023 dated Oct. 24, 2024, 98 pages.

* cited by examiner

FIG. 10

RENTAL VEHICLE SYSTEM OPTIMIZATION

RELATED APPLICATION

The subject patent application is a continuation of U.S. patent application Ser. No. 17/204,023, filed on Mar. 17, 2021 and entitled "RENTAL VEHICLE SYSTEM OPTIMIZATION," the entirety of which is incorporated by reference herein.

TECHNICAL FIELD

This application relates to techniques for optimizing various aspects of rental vehicle systems

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described herein that provide techniques for optimizing various aspects of rental vehicle systems.

According to an embodiment, a system is described that facilitates providing diverse vehicle suggestions using virtual voters. The system comprises a memory that stores computer executable components, and a processor that executes the computer executable components stored in the memory. These computer executable components comprise a search component that receives a request for a rental vehicle booking from a user identity and identifies available vehicles included in a fleet of rental vehicles that satisfy one or more criteria for the rental vehicle booking included with the request. The computer executable components further comprise a ranking component that ranks the available vehicles according to an estimated preference priority order for the user identity based on different preference profiles of virtual users representing different combinations of preference weightings for the one or more criteria, a recommendation component that generates an ordered list of the available vehicles based on the estimated preference priority order, and a results component that provides the ordered list to the user identity to facilitate selecting one of the available vehicles for booking.

In another embodiment, a system is described that facilitates minimizing redundancy in rental vehicle options provided in response to a user query. The system comprises a memory that stores computer executable components, and a processor that executes the computer executable components stored in the memory. These computer executable components comprise a search component that receives a request for a rental vehicle booking from a user identity and identifies available vehicles that satisfy one or more criteria for the rental vehicle booking included with the request. The computer executable components further comprise a request interpretation component that determines whether one or more properties of the available vehicles are relevant to the user identity, and a grouping component that groups the available vehicles into one or more booking options based on whether the one or more properties of the available vehicles are relevant to the user identity. The computer executable components further comprise a results component that generates a search result list for presenting to the user identity comprising the one or more booking options.

An additional embodiment is directed to a system that provides for dynamic car scheduling. The system comprises a memory that stores computer executable components, and a processor that executes the computer executable components stored in the memory. These computer executable components comprise a booking component that accepts bookings for rental vehicles from a fleet of rental vehicles based on a determination that a schedule of vehicle assignments assigning the rental vehicles to the bookings is achievable at booking time that satisfies first fixed criteria for the bookings. The computer executable components further comprise a dynamic scheduling component that dynamically adjusts the schedule after the booking time based on reception of new booking requests for the rental vehicles by rearranging the vehicle assignments in a manner that satisfies the first fixed criteria and second fixed criteria for the new booking requests. For example, the first fixed criteria and the second fixed criteria can include a rental vehicle type and a rental timeslot, and wherein the schedule of vehicle assignments ensures a requested vehicle type is available for a requested timeslot. In various implementations, the dynamic scheduling component adjusts the schedule by rearranging the vehicle assignments in a manner that minimizes cost attributed to utilization of the fleet.

One or more additional embodiments are directed a system for optimizing fleet utilization of a battery electric vehicle (BEV) rental system based on predicted charge levels. The system comprises a memory that stores computer executable components, and a processor that executes the computer executable components stored in the memory. These computer executable components comprise a charge prediction component that determines forecasted charge levels of battery electric vehicles (BEVs) in association with usage of the BEVs in a vehicle sharing operation wherein the BEVs are available for renting for varying durations of time. The computer executable components further comprise a booking component that controls the renting of the BEVs based on the forecasted charge levels.

In some implementations of these embodiments, the computer executable components further comprise a scheduling component that identifies one or more battery electric vehicles of the battery electric vehicles that have a forecasted charge level at a time of initiation of a potential future rental agreement for usage of one of the battery electric vehicles that satisfies a minimum charge level required for the potential future rental agreement. With these implementations, the computer executable components can further comprise a recommendation component that provides a recommendation identifying the one or more battery electric vehicles as candidate rental vehicles to an entity requesting the potential future rental agreement.

In another embodiment, a system is provided that facilities predicting late rental vehicle returns and mitigating potential downstream effects. The system comprises a memory that stores computer executable components, and a processor that executes the computer executable components stored in the memory. These computer executable components comprise a departure recommendation component that determines a recommended departure time at which a rental vehicle should initiate a route to a rental vehicle return location based on a current time, a scheduled return time for the rental vehicle, a current location of the rental vehicle and traffic data associated with the route. The computer executable components further comprise a notification component that sends a departure notification to a current renter of the rental vehicle indicating the recommended departure time.

In some implementations of this embodiment, the computer executable components further comprise a return estimation component that estimates an expected return time at which the rental vehicle will be returned to the rental vehicle return location based on the scheduled return time, the current location and the traffic data. With these implementations, the notification component further sends a late arrival notification to a booking system associated with the rental vehicle indicating based on a determination that the expected time is later than the scheduled time, the late arrival notification identifying the expected time as a late arrival time for the rental vehicle. The booking system can further change one or more subsequent rental vehicle bookings affected by the late arrival time to minimize one or more losses associated with late arrival of the rental vehicle.

In some embodiments, elements described in connection with the disclosed systems can be embodied in different forms such as a computer-implemented method, a computer program product, or another form.

DESCRIPTION OF THE DRAWINGS

FIG. 10 illustrates dynamic scheduling of rental vehicle bookings in accordance with one or more embodiments of the disclosed subject matter.

DETAILED DESCRIPTION

Figure 1:
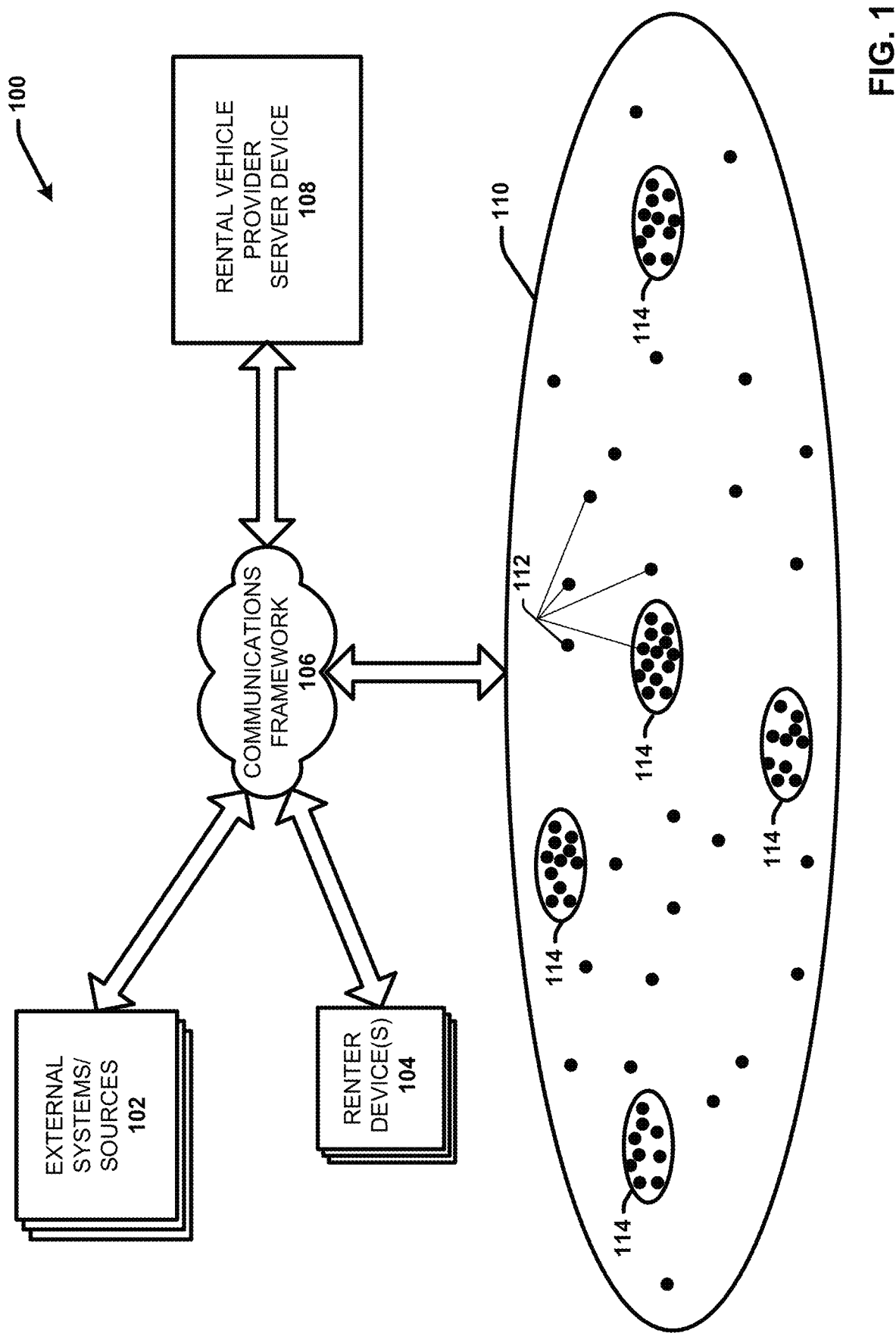
FIG. 1 illustrates a block diagram of an example, non-limiting rental vehicle system in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section. The disclosed subject matter is directed to systems, computer-implemented methods, apparatus and/or computer program products that facilitate optimizing various aspects of modern rental vehicle systems.

In some embodiments, techniques are described for optimizing the online rental vehicle booking process by tailoring the search results based on inferred renter preferences. According to an embodiment, these techniques include employing virtual voters to facilitate identifying and ranking rental vehicle options in response to a search query based on diverse user preferences.

In this regard, online rental vehicle search functions generally provide a set of preferences for users to select/set when searching for a vehicle to book. For example, the preferences can include pick-up location, rental timeslot (e.g., pick-up date/time and drop-off date/time), vehicle type, price range, and so on. However, it is infeasible to ask users to weigh all these preferences against each other. This means for example that a booking provider cannot determine from the selected preferences whether a vehicle of the preferred type that is located at a farther distance from a desired pick-up location is preferable to another vehicle at the desired pick-up location that is an alternate type. Given a rental vehicle system that provides many different vehicle alternatives at various station locations and the fact that all users and situations are different (e.g., meaning different implicit weighing's of preferences), it becomes hard for the booking provider to present qualitative suggestions based on the user search input.

With this problem in mind, the one or more embodiments of the disclosed subject matter provide a rental vehicle search function that employs a fixed set of diverse virtual users, together representing all possible combinations of preference weighing's. When a user searches for a vehicle using the search function, the virtual users rank all available vehicle options based on their individual preference profile. The search function then returns a list of suggested vehicles that is based on the distinct set of the virtual users' top-ranked vehicles, followed by their second-ranked vehicles, and so on. This method above favors diversity opinions as opposed to "majority rules," which results in better suggestions according to conditional probabilities. For example, given that the top suggestion presented to the user is the requested vehicle model 500 meters away, the search function accounts for the fact that the user would not choose the same car model that is 600 meters away and the same price. Accordingly, rather than placing the 600-meter distanced car of the same model in second place in the search results, the search function may instead determine (based on the virtual voter's preferences and the user's preferences) that it is preferable to place a non-requested car model that is 300 meters away in second place.

In another embodiment, techniques are described for minimizing redundancy in rental vehicle options provided in response to a user query. In this regard, rental vehicles can have many different properties or features. For example, rental vehicles can vary with respect to model, engine, number of seats, color, and various additional features such as including a towbar, keyless entry, four-wheel drive, etc. This innovation solves the problem of exposing a user to available options when booking a vehicle without an overload of information.

To facilitate this end, when booking a rental vehicle, the properties that are important for a user are captured in an intent. The available cars in the fleet are then grouped into booking options. The grouping is done by the properties that are important for the user while properties not important are ignored. For example, assume two vehicles of the preferred model type are available, one with a towbar and one without.

If the user has expressed an interest in a vehicle with a towbar, the search results can treat the two vehicles as different options. However, if the user is not interested in a towbar, the search results can group the two vehicles as the same option. In this way, the number of options presented to the user in the search results is significantly reduced by de-duplicating options that from a purely vehicle perspective are two different types of cars, but for a specific user are seen as the same option. As a result, the user is not overwhelmed by redundant choices and the screen real-estate can be optimized with more relevant information, alternate information, advertisements and so on.

Various additional embodiments of the disclosed subject matter are directed to techniques for optimizing fleet utilization. In some embodiments, these techniques involve dynamic vehicle scheduling. In this regard, in a station-based vehicle sharing service, in order to be dependable from a customer perspective, the service provider must keep the promise that an accepted rental vehicle booking will be satisfied as specified in the booking agreement (e.g., that the selected vehicle type will be available at the selected station for the selected timeslot). These promises are difficult to ensure due to cancelations, late pick-ups and returns, vehicle break downs, unexpected maintenance issues, and so on.

As used herein, dynamic vehicle scheduling refers to task of automatically scheduling rental vehicle bookings on a fleet of vehicles in such a way that the cost (e.g., attributed to the number of unfulfilled bookings, attributed to customer dissatisfaction, etc.) is minimized while ensuring all accepted rental vehicle booking agreements can be fulfilled. To facilitate this end, the rental vehicle booking system employs a dynamic scheduler wherein the bookings are not tied to specific vehicles. Instead, new bookings are accepted/rejected based on the result of the scheduler's ability to create an acceptable schedule containing the new booking and all existing bookings. The dynamic scheduler can also on the fly move bookings to other vehicles when a new booking is requested, which increases the availability perceived by the customer and the utilization of the fleet.

The dynamic scheduler also has support for scheduling moves of vehicles (e.g., between stations), which is an important part when matching supply and demand in a vehicle sharing service. In this regard, the dynamic scheduler can control moving vehicles between different stations in order to balance the demand (intended car bookings) and the supply (available cars). The dynamic scheduler also provides for a smart vehicle assignment in which the specific vehicle that is served to a customer can be decided closer (e.g., within a defined time window) to the pick-up time. The smart car assignment can and take into consideration various additional dynamic factors, such as fuel level, cleanliness, etc., to optimize vehicle assignment with respect to the customer experience as well as operational experience.

One or more additional embodiments are directed to techniques for optimizing fleet utilization of a BEV rental system based on predicted charge levels. The system is designed in the context of a BEV car rental service that provides BEV stations at various locations throughout a geographic area (e.g., a city or the like), and allows renting the BEVs for short-term periods (e.g., 30 minutes) as well as long-term periods (e.g., days, weeks, etc.). The stations can provide for charging the BEVs and serve as pick-up and drop-off location options for the BEVs. With such a car sharing service, the operating company wants to guarantee a certain battery charge for vehicles given to customers. The operating company must decide whether it can allow a customer to book a car at a certain point in the future, while maximizing the fleet utilization, but without risking a customer getting a car with an unacceptably low charge level.

To facilitate this end, the disclosed techniques predict a BEV's future charge level given the BEV's schedule and telematics data. The booking system further controls future bookings for the BEVs by matching new bookings with BEVs with appropriate expected charge levels that meet the expected charge level demands of the future bookings. For future bookings, the charge prediction component subtracts from the BEV's predicted charge state depending on the length of the booking and other factors known or inferred about the planned journey, such as outside temperature and the like. For future time in between bookings, the charge prediction component can add a charge state given a formula that is dependent on the BEV's initial charge state, the time being charged, the BEV model, the parking's charger model and the number of cars potentially sharing the same charger circuit at the station.

One or more additional embodiments are directed to techniques for predicting late rental vehicle returns and mitigating potential downstream effects. In this regard, customers returning their rental vehicle back too late is a big problem for rental vehicle providers who strive for tight booking schedules in order to maximize fleet utilization. The disclosed solution uses traffic data to determine when a customer should drive back to their return station in order to make it back in time for their scheduled drop-off time. This information is used both to notify the customer (that it's time to head back) and to notify customer support when a customer is likely to be late and affect a subsequent booking. The dynamic scheduler can further use this information to reshuffle subsequent bookings around (to different cars) in order to minimize the number of customers affected by a late arrival.

In addition, this system also books and assigns cars (marking them available) based on forecasted late returns at the time of booking. For example, when a booking is made, the system looks at the user profile, the booking type, and the history of the user being late (e.g., in general and being late at certain locations, on certain days/dates, etc.). Using machine learning, the system can output with a confidence interval whether and to what degree the rented vehicle is likely to be returned late at the time of booking (e.g., "There is an 80% certainty this trip will be 10 minutes late"). This allows the booking system to know ahead of time (e.g., when the booking is made days or weeks before pick-up) when a rental vehicle will likely be returned and thus when it will be available again.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting rental vehicle system 100 in accordance with one or more embodiments of the disclosed subject matter. The rental vehicle system 100 can include a fleet of vehicles associated with a rental vehicle service provider (e.g., a rental vehicle operating company) that can be rented for use for varying durations of time (e.g., 30 minutes, hours, days, weeks, months, etc.). The term "vehicle" is used hereinto refer to an automobile. The terms "vehicle," "automobile," "car," and the like are used herein interchangeable unless context warrants particular distinction amongst the terms.

In the embodiment shown, the vehicles included in the fleet are represented by the small black dots. The vehicles 112 can be associated with at least one geographic area 110 that includes one or more stations 114 where the vehicles can be rented (e.g., picked-up and returned). The stations 114 can be dispersed at various locations throughout the geographic area 110. The size of the geographic area 110 can vary. For example, the geographic area 110 can correspond to a town, a city, a state, a country, etc. In the embodiment shown, the some of the vehicles in the fleet are located away from the stations 114 to indicate these vehicles are either currently rented or being transported between stations. For example, these vehicles can be currently parked or traveling on streets or roads (not depicted).

The number and type of vehicles 112 included in the fleet can vary. In this regard, the vehicles 112 can include a variety of different types of vehicles with a variety of different features. For example, the vehicles 112 can include various makes and models of sedans, coupes, sports cars, station wagons, hatchbacks, convertibles, sport-utility vehicles (SUVs), vans, minivans, trucks and so on. The vehicles 112 can include traditional gasoline powered vehicles, hybrid vehicles and BEVs. The vehicles 112 can also include manually operated vehicles (e.g., include an automatic transmission, a semi-automatic transmission and/or a manual transmission) as well as self-driving vehicles.

In some embodiments, all (or at least some) of the vehicles 112 included in the fleet can be BEVs. With these embodiments, the stations 114 can include or correspond to charging stations where the BEVs can be charged. For example, the charging stations can include several parking spots that are coupled to one or more charging units via which the BEVs are charged. In some implementations of these embodiments, the rental vehicle service provider can provide a BEV sharing service wherein the BEVs can be rented hourly (or even by the minute) as well as for longer durations of time (e.g., daily, weekly, monthly, etc.). In some implementations, the BEV sharing service can allow users (e.g., renters) to pick-up the BEVs at any of the charging stations and return the vehicles to any charging station with an available charging spot.

System 100 further includes a rental vehicle provider server device 108 that provides various features and functionalities related to managing the operations of the rental vehicle system 100. In some embodiments, the rental vehicle provider server device 108 can provide an online booking service that provides for booking the vehicles 112 using a network accessible platform. For example, the network accessible platform can include a web-application and/or a mobile application (e.g., a thin-client application, a thick-client application, a hybrid application, etc.). With these embodiments, the rental vehicle provider server device 108 can be accessed by users/renters via a communications framework 106 using a suitable computing device. In the embodiment shown the computing devices used by users/renters to access the rental vehicle provider server device 108 are represented by the renter devices 104.

The renter devices 104 can respectively include an access application that provides for accessing the booking service logic provided by the rental vehicle provider server device 108 via a communication framework 106. For example, the access application may include a standard web browser, rental vehicle provider server device 108 may include a web server, and the communication framework 106 may include the Internet. Additionally, or alternatively, the access application may also include proprietary applications specifically developed for one or more platforms or devices. For example, access application may include one or more instances of an Apple iOS, Android, or WebOS application or any suitable client-side application for use in accessing the rental vehicle provider server device 108 over communications framework 106.

The communication framework 114 may include any wired or wireless network, such as the Internet, WiMax, wide area cellular, or local area wireless network. The communication framework 114 may also include personal area networks, such as Bluetooth™ and infrared networks. Communications on communications framework 114 may be encrypted or otherwise secured using any suitable security or encryption protocol.

The renter devices 104 can include various types of input/output computing devices capable of accessing the rental vehicle provider server device 108 via the communications framework 106. For example, some suitable renter devices can include but are not limited to a desktop computer, a laptop computer, a television, an Internet enabled television, a mobile phone, a smartphone, a tablet personal computer (PC), or a personal digital assistant (PDA), a heads-up display (HUD), an augmented reality (AR) device, a virtual reality (VR) device, a wearable device, and the like.

In various embodiments, the renter devices 104 correspond to personal computing devices associated with the individuals that rent and use the vehicles 112, such as personal smartphones, personal smartwatches and the like. In this regard, it should be appreciated that although the renter devices 104 are illustrated remote from the geographic area, in many implementations, these devices can be carried or worn by the users when located inside the geographic area 110, inside the vehicles 112, at or near the vehicles 112, and at or near the stations 114, and at the vehicles 112.

The term user is used herein to refer to an entity (e.g., a person or a machine) that uses one or more features and functionalities of system 100. For example, a user can correspond to a person, a system, or machine that performs a rental vehicle search query, a person or entity that rents a vehicle, and the like. In this context, the terms "user" and "renter," are used interchangeably. The term "user identity" is used hereinto refer to a user or renter that can be recognized by the system as having an identity. For example, the identity can correspond to a name, a username, a device number, a booking number, an account name/number, an internet protocol address, and so on. The terms "user" and "user identity" are used herein interchangeably unless context warrants particular distinction amongst the terms.

The rental vehicle provider server device 108 can include any network server or virtual server, such as a file or web server. The rental vehicle provider server device 108 can include or be operatively coupled to processing circuitry (e.g., one or more processors or microprocessors), memory (e.g., RAM, ROM, and hybrid types of memory), and storage devices (e.g., hard drives, optical drives, and tape drives). The processing circuitry included in the rental vehicle provider server device 108 may execute a server process for supporting/executing computer-executable instructions defined by various components described infra, while the access applications of the renter devices 104 execute a corresponding client process.

The rental vehicle provider server device 108 can also provide functions related to remotely tracking the vehicles 112, remotely controlling the vehicles 112, and remotely managing operations at the stations 114. In the embodiment shown, a double headed arrow is illustrated connecting the geographic area 110 to the communication framework 106 to indicate the stations 114 and the vehicles 112 can be communicatively coupled to the rental vehicle provider server device 108 via the communications framework 106. For example, one or more operating systems at the stations 114 can be communicatively coupled to the rental vehicle provider server device 108 and provide real-time information regarding the vehicles located at the stations and movement of vehicles to and from the stations. The one or more operating systems at the stations 114 can also provide real-time information regarding the status of vehicles are currently located at the station 114. For example, the status information can indicate what vehicles are available and unavailable, whether a vehicle is in-cleaning, whether a vehicle is undergoing maintenance, whether the vehicle is charging, current fuel/battery levels of the vehicles, and so on. In implementations in which stations 114 correspond to or include charging stations for BEVs, the one or more operating systems can also provide real-time information regarding the charging operations. For example, such information can identify BEVs currently charging, the number of available charging spots, the number of BEVs sharing the same charging circuit, and so on.

The vehicles 112 themselves can also be communicatively coupled to the rental vehicle provider server device 108 via the communication framework 106. For example, the vehicles 112 can include suitable hardware and software to wirelessly communicate information with the rental vehicle provider server device 108 regarding their location, movement, status, usage and so on. In this regard, the vehicles 112 can include electronic systems/devices that can be electrically accessed and/or controlled (e.g., via electric signals). The vehicle electronic systems/devices can encompass various automotive electronic domains, including but not limited to: engine electronics, transmission electronics, chassis electronics, passive safety electronics, driver assistance electronics, passenger comfort electronics, infotainment systems, and electronic integrated cockpit systems. For example, the vehicle electronic systems/devices can include a media system (e.g., audio and/or video), a radio system, a back-up camera system, a lighting system, a cruise control system, a power locking system, a navigation system, a self-driving or semi-safe driving system, a vehicle sensor system, a communication system, and the like.

In this regard, the vehicles 112 can respectively include or be operatively coupled to one or more electronic control units (ECUs) to facilitate remotely accessing and/or controlling vehicles 112 by the rental vehicle provider server device 108. An electronic control unit (ECU) is an embedded system in automotive electronics that controls one or more of the electrical systems/devices of a vehicle. The ECUs can include hardware, software, or a combination of hardware and software that is configured to perform functions associated with the respective vehicle electronic systems/devices. For example, different types of ECUs can include one or more of an electronic control module (ECM), a powertrain control module (PCM), a transmission control module (TCM, a brake control module (BCM), a central control module (CCM), a central timing module (CTM), a general electronic module (GEM), a body control module (BCM), a suspension control module (BCM), a door control unit (DCU), an engine control unit (ECU), an electric power steering control unit (PSCU), a human-machine interface unit (HMIU), a speed control unit (SCU), a telematic control unit (TCU), and the like. Sometimes one assembly incorporates several of the individual control modules (PCM is often both engine and transmission). The vehicles 112 can have a plurality of different dedicated ECUs for different electronic systems/devices of the vehicle 112, or one or more centralized ECUs configured to control several of the vehicle electronic systems/devices. Taken together, the ECUs are sometimes referred to as the vehicle's computing system.

The rental vehicle provider server device 108 can also be communicatively coupled to one or more external systems/sources 102 via the communications framework 106. These external systems/sources can provide a variety of information that can facilitate rental vehicle booking and management operations by the rental vehicle provider server device 108. For example, in some implementations, the external systems/sources 102 can provide weather information and traffic information associated with the geographic area 110. The external systems/sources 102 can also include social media systems that can provide relevant information regarding preferences of the renters, activities of the renters, schedules of the renters, and the like. The external systems/sources 102 can also provide information regarding current supply and demand for vehicles in the geographic area, pricing information, information regarding activities and events in the geographic area, airline information, and other contextual information that can influence the operations of the rental vehicle system 100.

It should be appreciated that the embodiments of the subject disclosure depicted in various figures disclosed herein are for illustration only, and as such, the architecture of such embodiments are not limited to the systems, devices, and/or components depicted therein. In some embodiments, one or more of the components of system 100 and other systems described herein can be executed by different computing devices (e.g., including virtual machines) separately or in parallel in accordance with a distributed computing system architecture. For example, although a single rental vehicle provider device 108 is shown in system 100, in various embodiments, the system can include several instances of the rental vehicle provider server device 108 (e.g., multiple servers). In addition, the various components of the rental vehicle provider server device 108 discussed infra can be distributed across different servers. System 100 can also comprise various additional computer and/or computing-based elements described herein with reference to operating environment 2200 and FIG. 22 as well as operating environment 2300 and FIG. 23. In several embodiments, such computer and/or computing-based elements can be used in connection with implementing one or more of the systems, devices, components, and/or computer-implemented operations shown and described in connection with FIG. 1 or other figures disclosed herein.

Figure 2:
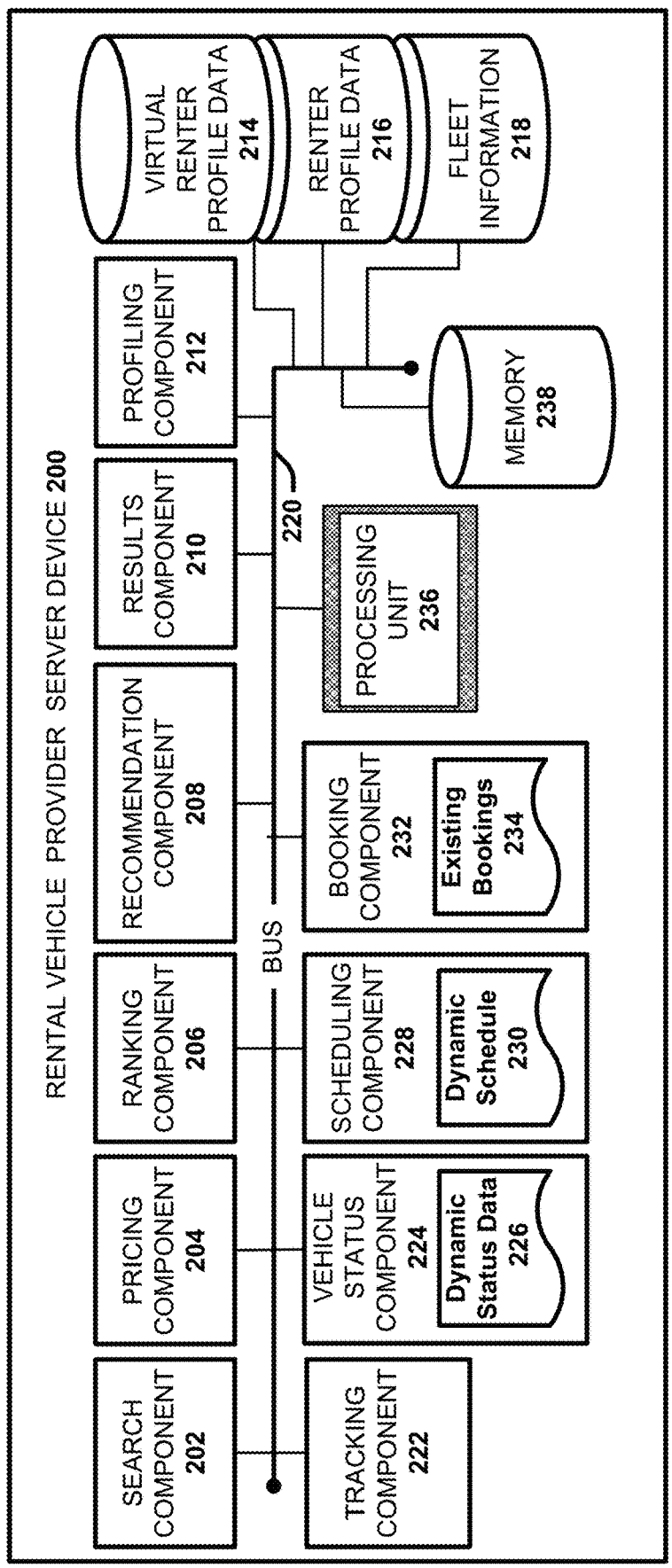
FIG. 2 illustrates a block diagram of an example, non-limiting rental vehicle provider server device that facilitates providing diverse vehicle suggestions using virtual voters in accordance with one or more embodiments of the disclosed subject matter.

FIG. 2 illustrates a block diagram of an example, non-limiting rental vehicle provider server device 200 that facilitates providing diverse vehicle suggestions using virtual voters in accordance with one or more embodiments of the disclosed subject matter. In various embodiments, the rental vehicle provider device 200 can correspond to rental vehicle server device 108, or vice versa. Repetitive description of like elements employed in respective embodiments is omitted for sake of brevity.

Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

In this regard, the rental vehicle server device 108 can include several computer/machine executable components that can be or include computer executable instructions to perform the corresponding operations described herein. In the embodiment shown, these computer executable components include search component 202, pricing component 204, ranking component 206, recommendation component 208, results component 210, profiling component 212, tracking component 222, vehicle status component 224, scheduling component 228, and booking component 232.

The rental vehicle server provider device 108 can further include or be operatively coupled to at least one memory 238 and at least one processing unit 236. In various embodiments, the at least one memory 238 can store executable instructions (e.g., the search component 202, the pricing component 204, the ranking component 206, the recommendation component 208, the results component 210, the profiling component 212, the tracking component 222, the vehicle status component 224, the scheduling component 228, the booking component 232, and additional components described herein) that when executed by the at least one processing unit 236, facilitate performance of operations defined by the executable instructions. The rental vehicle provider server device 108 can further include or be operatively coupled to one or more information databases, including virtual rental profile data 214, renter profile data 216 and fleet information 218. In other implementations, the information included in these databases can be stored in memory 218 or another suitable data structure accessible to the rental vehicle provider server device 108. The rental vehicle provider server device 108 can further include a system bus 220 that communicatively couples the various components of the rental vehicle provider server device 108. Examples of said processing unit 236 and memory 238, as well as other suitable computer or computing-based elements, can be found with reference to FIG. 22 with respect to processing unit 2204 and system memory 2206, and can be used in connection with implementing one or more of the systems or components shown and described in connection with FIG. 2 or other figures disclosed herein.

With reference to FIGS. 1 and 2, the various component of the rental vehicle provider server device 108 illustrated in FIG. 2 provide a variety of different functions that facilitate booking rental vehicles 112 provided by the rental vehicle provider. The search component 202 can provide a search function that allows renters to search for available rental vehicles included in the fleet for booking online in association with accessing the rental vehicle server provider device 108 via a network accessible platform (e.g., a web-application, a client application, etc.) using their respective renter devices 104. For example, the search function can provide for receiving user input identifying one or more criteria for the rental vehicle booking, such as, the timeslot for the booking (e.g., pick-up time/date and return time/date), the pick-up location, the return (or drop-off) location, the desired vehicle type, and so on.

In a typical rental vehicle booking scenario, the renter will generally specify a required or preferred timeslot time for the rental vehicle and a required or preferred location for the rental vehicle (e.g., pick-up and return location). Conventional search functions will then identify and return a list of all available vehicles that satisfy these criteria. In a rental vehicle system that provides a wide variety of diverse vehicle options, this search results list will often include an endless number of vehicle options to sift through, many of which are redundant from the user's perspective. Ideally, the search results should list the vehicles in an order that reflects the renter's preferences, placing the most preferred available vehicle at the top of the list, followed by the second most preferred, and so on. However, aside from the preferred vehicle timeslot and pick-up/return location, most users do not indicate what other preferences they have when choosing a rental vehicle online.

In this regard, there are many additional criteria/parameters associated with a rental vehicle booking that can influence the renter's vehicle choice that are not often specified in the search request (e.g., price, vehicle type, vehicle features, and so on). Further, even if the renter specifies various required and/or preferred parameters in their search request, it is infeasible to ask the renter to weigh all these preferences against each other. For example, it is infeasible to ask the renter if they prefer a vehicle of an indicated model type over another vehicle of a different model type that is slightly cheaper. In addition, the renter's preferences can vary based on context. For example, in one scenario in which the renter is traveling alone, the renter may prefer the cheaper alternative, while in another scenario in which the renter is traveling with friend who loves the indicated model type, the renter may prefer the more expensive option to appease the friend.

The rental vehicle provider server device 108 provides a solution to this problem by using virtual voters to facilitate ranking the available vehicles that satisfy a renter's required criteria to reflect an inferred preference order of the renter. The virtual voters include a fixed set of diverse virtual renters that collectively represent all possible combinations of preference weighing's for the different criteria/parameters associated with the rental vehicle booking. When a user searches for a vehicle using the search function, the virtual users rank all available vehicle options based on their individual preference profile. This action can be likened to asking many (e.g., 20, 50, 100, 1000, etc.) different people with different vehicle preferences and needs to consider all parameters associated with all the available vehicles and provide a ranked list of their most preferred vehicles. The search function then returns a list of suggested vehicles that is ordered based on the distinct set of the virtual users' top-ranked vehicles, followed by their second-ranked vehicles, and so on.

In the embodiment shown, the virtual renter profile data 214 can include the preference profiles for the set of virtual renters (also referred to herein as virtual voters). For example, the virtual renter data 214 can define a fixed set of preference profiles representing different virtual renters, wherein each preference profile defines a different preference weighting distribution for a defined set of rental vehicle booking parameters. In this regard, the different preference profiles represent different combinations of preference weightings for the different parameters, wherein the preference weightings reflect the relative importance of each parameter to the virtual renter when choosing a rental vehicle. The rental vehicle booking parameters can encompass a set of predefined variables that are considered relevant to at least one hypothetical renter when selecting a rental vehicle for booking. These criteria/parameters can vary for a traditional daily/weekly/monthly rental vehicle system and the above-described BEV sharing system.

For example, in various embodiments, the set of predefined parameters can include (but are not limited to): timing parameters (e.g., pick-up time/date, drop-off time/date, pick-up time window, drop-off time window, duration, etc.), location parameters (e.g., pick-up location, drop-off location, pick-up area, drop-off area, distance of the vehicle to the user, etc.), pricing parameters (e.g., total price, daily rate, hourly rate, fee's associated with penalties, etc.), and vehicle parameters. The vehicle parameters can include for example, but are not limited to, vehicle type, make/model, color, year, size, number of seats, safety rating, diving system (e.g., self-driving, manual, automatic, smart-assisted driving, four-wheel drive, all-wheel drive, standard, etc.), engine type, mileage, customer rating, and so on. The vehicle parameters can also include a wide variety of other vehicle features, such as but not limited to, interior type, back-up camera, touchscreen, convertible, sunroof, child safety locking, keyless start, keyless entry, towbar, towing capacity, racks, storage, built-in vacuum, automatic high beams, heated/cooling steering wheel, heated/cooling seats, adaptive cruise control, etc. In some embodiments, particularly with respect to BEVs, the set of predefined parameters can also include battery level (or fuel level for non-electric vehicles), battery consumption rate (e.g., or fuel consumption rate), and speed capacity. It should be appreciated that the various parameters described above are not exhaustive and the parameters can vary.

In one or more embodiments, the search component 202 can receive a request for a rental vehicle booking from a user that identifies one or more criteria for the rental vehicle booking. For example, the one or more criteria could include a timeslot for the rental vehicle booking, a pick-up location, a drop-off location, and so on. The search component 202 can then identify all (or a restricted subset) of the available vehicles in the fleet that satisfy the one or more search criteria (e.g., all vehicles that are available for the timeslot at the desired pick-up location). The specific criteria that are indicated in the search request can vary. For example, in some embodiments, the search function can include a selectable list of all of the defined parameters included in the set used for the virtual renters and allow the user to optionally select desired criteria from the list in association with submitting the search request. In this regard, the user definable/selectable search criteria can vary and account for a variety of parameters/variables associated with the rental agreement context (e.g., location, timeslot, duration, number of drivers, cost, service level, etc.) and the rental vehicle itself (e.g., vehicle type, vehicle size, number of seats, and other vehicle features).

In some implementations, the user selected search criteria can be considered required parameters for the rental vehicle booking. With these implementations, the search component 202 can identify only available vehicles that satisfy the required criteria. In other implementations, the user selected criteria can be considered preferred parameters, yet not required. With these implementations, the search component 202 can identify available vehicles that may not satisfy the user selected criteria. Still in other embodiments, the search component 202 can provide for receiving both required criteria and preferred criteria. For example, the search component 202 can allow the user to indicate what criteria is required (e.g., location and timeslot) and what criteria is preferred and thus optional/not required (e.g., vehicle make/model, vehicle color, etc.). Additionally, or alternatively, the search component 202 can apply predefined rules defining what criteria is considered required and what criteria is considered preferred. For example, in some implementations, the search component 202 can be configured to consider the location and timeslot criteria required parameters while considering all other selectable parameters/criteria preferred.

In some embodiments, the available vehicles identified by the search component 202 can already be associated with pricing information (e.g., total cost, daily rate, hourly rate, weekly rate, etc.). In other embodiments, the pricing component 204 can generate the pricing information for the available vehicles. The manner in which the pricing component 204 determines the pricing information for the available vehicles can vary. For example, in some implementations, the fleet information 218 can define pricing rules for each vehicle in the fleet. With these embodiments, the pricing component 204 can employ the pricing rules defined in the fleet information to determine the cost associated with each available rental vehicle booking option. The pricing component 204 can also dynamically determine the pricing information based on the current and forecasted supply and demand.

The ranking component 206 can further rank the available vehicles according to an estimated preference priority order for the user providing the search request based on the different preference profiles of the virtual users. For example, in an embodiment in which the search request identifies one or more required criteria for the rental vehicle booking, all of the available vehicles will satisfy the one or more required criteria. With these embodiments, the ranking component 206 can identify all additional parameters associated with the available rental vehicles and use the virtual rental profile data 214 to rank the available vehicles according to their different preference weightings for the additional parameters. For example, assume the required criteria includes a timeslot and pick-up location. With this example, all the available vehicles will be available for the timeslot at the pick-up location. Using the virtual rental profiles, the ranking component 206 can then determine how each of the virtual renters would rank the available vehicles from most preferred to least preferred based on all the additional parameters associated with the available vehicles (e.g., type, size, color, additional features, etc.).

Figure 3:
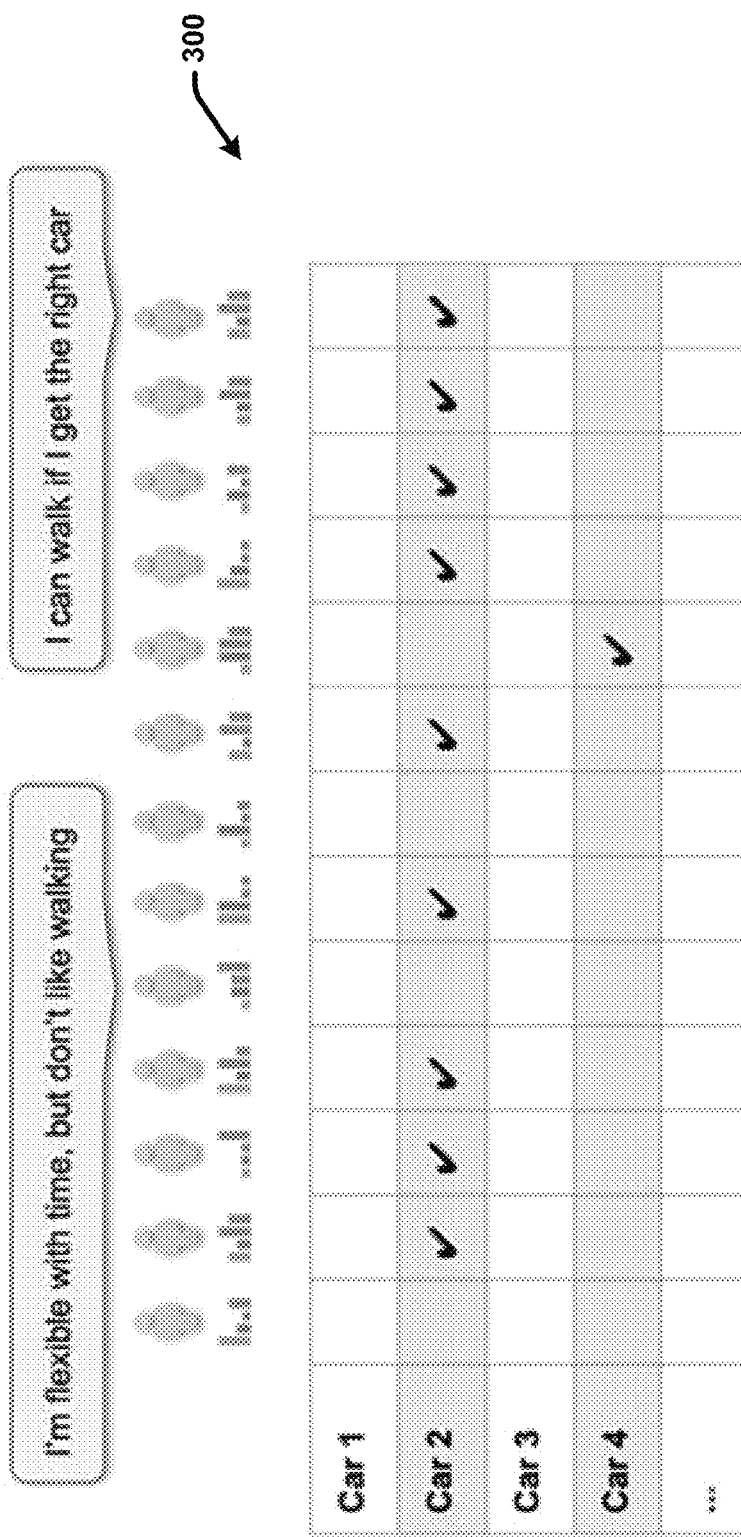
FIG. 3 presents a chart illustrating utilization of virtual voters to rank available rental vehicle options in accordance with one or more embodiments of the disclosed subject matter.

FIG. 3 presents a chart 300 illustrating utilization of virtual voters to rank available rental vehicle options in accordance with one or more embodiments of the disclosed subject matter. Chart 300 includes a list of available cars identified as car 1, car 2, car 4 and so on. In this example, assume a renter submitted a search request for a BEV in association with a BEV sharing system that includes several different stations throughout a city. Further assume that the search request indicated the user needs a car in the city as soon as possible for a duration of 6 hours and the current location of the user is known at the time of reception of the request. With this example, the search component 202 can identify all cars in the city at any station that are available for 6 hours within a defined window of the current time (e.g., available now and/or within 2 hours of the current time for example). In this regard, the available car can be at different stations and thus different distances to the current distance of the user, available at different times, and differ with respect to many additional features (e.g., type, make/model, color, year, battery level, etc.).

With reference to FIGS. 2 and 3, chart 300 demonstrates utilization of the virtual renters' preference profiles to determine how to rank these available cars in an order of most preferred to least preferred to the user without knowing how the user values the different options. For example, the search component 202 may have no idea whether the user would prefer a first car that is available sooner than a second car yet located a farther distance from the user. Maybe the user's preferences are similar to a virtual voter that is flexible with the time but doesn't like walking and would thus prefer a closer car as opposed to one that is available sooner. Alternatively, maybe the user's preferences are similar to another virtual voter that would prefer to walk to a farther car that has better features.

In an embodiment in which the system does not know these preferences of the user, the ranking component 206 can use the virtual voters to determine what car a majority of the virtual voters would consider the first choice, the second choice, and so on, even though they have different preference profiles. In this regard, using the different preference weightings of the virtual voters, the ranking component 202 can determine what car is the top choice of each virtual voter, the second choice of each virtual voter, and so on. Chart 300 reflects the top choices of each of the virtual voters. In this example, a majority of the virtual voters considered car 2 as the top choice.

The method above favors diversity opinions as opposed to "majority rules", which results in better suggestions according to conditional probability. The ranking of the available vehicles generated by the ranking component 206 based on the virtual voter profiles represents an estimated preference priority order of the available vehicles of the user. The recommendation component 208 can further generate an ordered list of the available vehicles based on the estimated preference priority order (e.g., from most preferred to least preferred), and the results component 210 can provide the ordered list to the user (e.g., as search results displayed via their renter device 104) to facilitate selecting one of the available vehicles for booking.

In some embodiments, the ranking component 206 can rank the available cars based solely on the majority votes of the virtual renters. For example, the ranking component 206 can rank the majorities top choice first, the majorities second choice second, the majorities third choice third, and so on. The ordered list generated by the recommendation component 208 can further correspond to the ranked list determined by the ranking component 206. In other embodiments, the recommendation component 208 (or the ranking component 206) can employ an ordering protocol that accounts for vehicles that differ based solely on a different value for a dynamic parameter, wherein the vehicle with the less favorable value is eliminated. For example, assume that the top-rated vehicle by the majority of the virtual voters is the user's preferred car model that is 500 meters away from the current location of the user. In this example, it makes no sense to place next top-rated vehicle in second place if everything about the second car is the same as the first car, yet its 600 meters away. For instance, it would be more preferable to place a non-requested car model that is 300 meters away in second place.

In this regard, a dynamic parameter is used herein to refer to continuous variable parameter that can have a range of values. For example, dynamic parameters can include price, location/distance, battery level, fuel level, mileage, customer rating, and any other non-binary value parameter. A static parameter is used herein to refer to a parameter that does not change (e.g., either the vehicle has this feature, or it doesn't). For example, static parameters can include vehicle type, make/model, color and other fixed vehicle features. With respect to the dynamic parameters, the recommendation component 208 can consider the different possible values for the dynamic parameters more or less favorable than one another. For example, the recommendation component 208 can consider a lower price better than a higher price, a closer distance better than a farther distance, higher customer rating better than a lower customer rating, and so on. The recommendation component 208 can further be configured to skip over including a vehicle in the ordered list if the vehicle has the same static parameters as the higher ranked vehicle, yet only differs with respect to a less favorable value for a dynamic parameter (e.g., all things being the same but this vehicle is more expensive, than go the next highest ranked vehicle by the majority of the virtual voters that has a different static parameter). This selection process is further detailed in FIG. 4.

Figure 4:
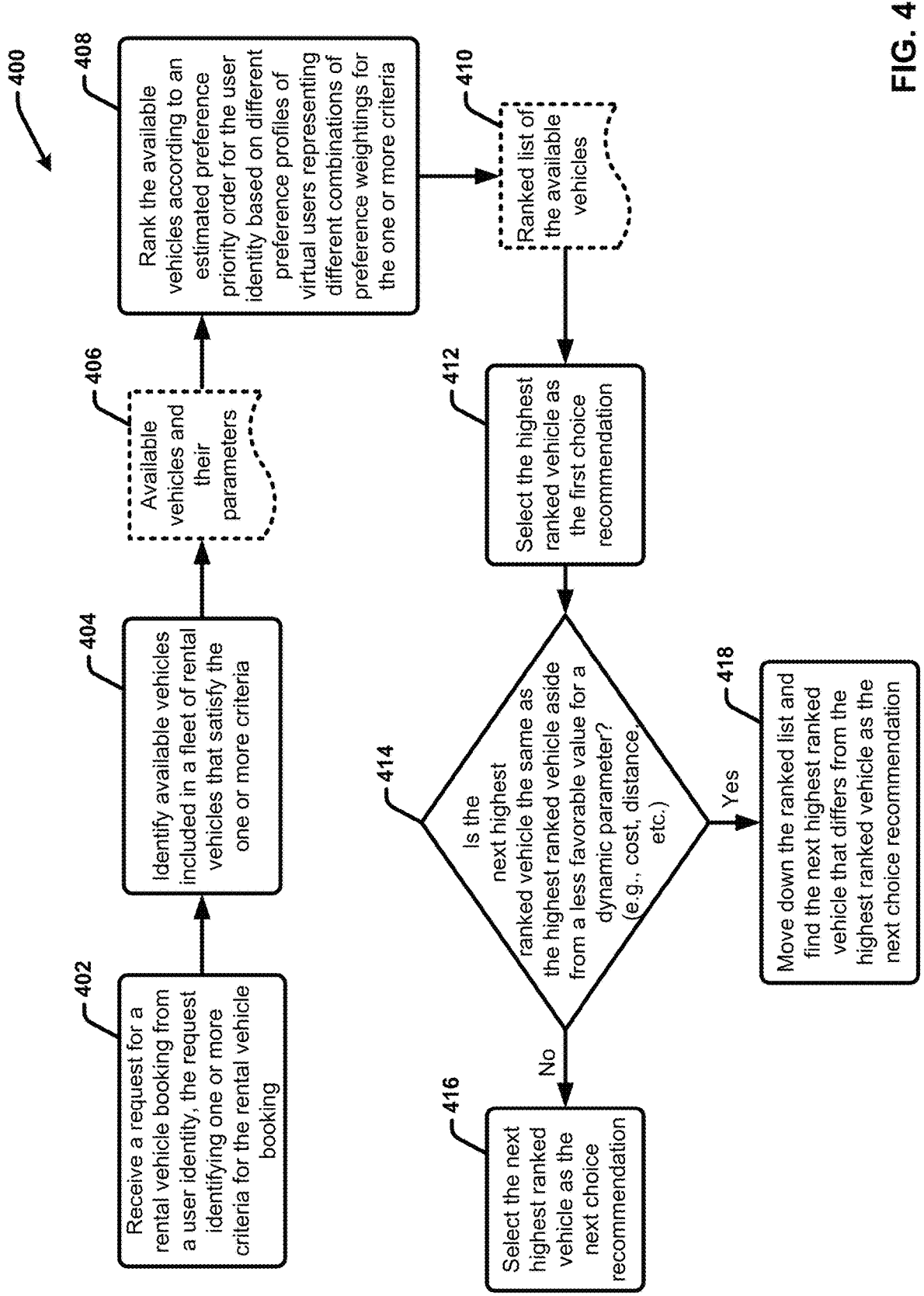
FIG. 4 provides a flow-diagram of an example process for ranking available rental vehicle options using virtual voters in accordance with one or more embodiments of the disclosed subject matter.

FIG. 4 provides a flow-diagram of an example process 400 for ranking available rental vehicle options using virtual voters in accordance with one or more embodiments of the disclosed subject matter. With reference to FIGS. 2 and 4, at 402, the request component 202 can receive a request for a rental vehicle booking from a user identity (e.g., a user/renter), wherein the request identifies one or more criteria for the rental vehicle booking. For example, the one or more criteria can include at least one required criterion (e.g., a timeslot, location, etc.) and optionally one or more preferred criteria (e.g., a preferred vehicle model). At 404, the search component 202 can identify available vehicles 406 in the fleet of rental vehicles that satisfy the one or more criteria. For example, the available vehicles 406 can include those vehicles that satisfy the required criteria as well as vehicles that satisfy both the required criteria and the optional criteria.

At 408, the ranking component 206 can rank the available vehicles according to an estimated preference priority order for the user identity based on different preference profiles of the virtual users representing different combinations of preference weightings for the one or more criteria. The ranking component 206 can further output a ranked list 410 of the available vehicles. The ranked list can list the majorities top-rated vehicle, followed by the majorities second top-rated vehicle, followed by the majorities third top-rated vehicle, and so on.

At 412, the recommendation component 208 can select the highest ranked vehicle as the first-choice recommendation for providing to the user in the search results. At 414, the recommendation component 208 can determine whether the next highest ranked vehicle in the ranked list 410 is the same as the highest ranked vehicle aside from a less favorable value for a dynamic parameter (e.g., cost, distance, etc.). If not, the recommendation component 208 can select the next highest ranked vehicle as the next choice recommendation at 416. However, if at 414 the recommendation component determines the next highest ranked vehicle is the same as the first (e.g., same static parameters) yet has a less favorable value for a dynamic parameter (e.g., a higher cost, a farther distance, etc.), than at 418, the recommendation component 208 can move down the ranked list 410 and find the next highest ranked vehicle that differs from the highest ranked vehicle (e.g., with respect to a static parameter) as the next choice recommendation. The recommendation component 208 can continue this process moving down through the ranked list 410 to generate the ordered list of rental vehicles for recommending to the user in the search results.

With reference again to FIG. 2, the above-described embodiments provide a mechanism to determine a user's preference order of available rental vehicles without knowing any or much information about the user's actual preferences. In one or more additional embodiments, the ranking component 206 and/or the recommendation component 208 can access and employ preference information for the user submitting a rental vehicle search request to facilitate generating the ranked listed of available vehicles for recommending to the user. The preference information can identify or indicate the user's preferences regarding various parameters (e.g., preferred pick-up location, preferred vehicle type, preferred vehicle color, preferred vehicle size, etc.) as well as identify or indict the user's preference weighting of the differ rental vehicle booking criteria/parameters (e.g., how important is the preferred pick-up location, type, color, size, etc.).

In some implementations of these embodiments, this preference information can be included in the renter profile data 216. For instance, the renter profile data 216 can include profiles for known users (e.g., current and past renters) and identify or indicate their vehicle/booking preferences. The profile data can also include tracked rental history data regarding past bookings of the renter. For example, the historical booking data can identify details of past bookings such as the parameters associated with the past bookings (e.g., booking location, booking time/date, vehicle chosen/assigned, etc.), as well as travel/usage history information for the past bookings (e.g., pick-up time, drop-off time, vehicle status at drop-off, etc.). With these embodiments, the ranking component 206 and/or the recommendation component 208 can use the renter's preference information in addition to the virtual voters to rank the available vehicles.

In some implementations of these embodiments, the ranking component 206 can identify a subset of the virtual renters with similar profiles to the user and use only this subset of virtual renters to generate the ranking of the available vehicles. For example, the ranking component 206 can select a subset of the different preference profiles of the virtual renters based on the subset having a defined degree of correspondence to a user profile for the user providing the search request. The ranking component 206 can further rank the available vehicles based on the subset of the different preference profiles. In other implementations, the recommendation component 208 can use the available preference information for the user (e.g., associated with their rental profile in the renter profile data 216) to refine or filter the ordered ranked list generated by the ranking component 206 based on the collective virtual voters.

In some embodiments, the preference information for a user included in the renter profile data 216 can be provided by the user (e.g., in association with setting up and establishing an account). Additional, or alternatively, the preferences component 212 can generate the preference information based on the user's search and booking history using one or more machine learning techniques. The preferences component 212 can also use one or more machine learning techniques to infer the user's preference weightings for the different parameters at the time of booking based on their booking history, provided search criteria and other contextual factors associated with the booking. For example, these other contextual factors can relate to booking time (e.g., time of day, day of week, day of the month), booking location, current location of the user, weather, traffic, events going on at or near the booking location, types of buildings/business at or near the booking location (e.g., if near an airport, if near a national park, etc.). In various embodiments, at least some of this context information can be gathered from one or more external system/sources 102, as discussed with reference to FIG. 1. In this regard, the preferences component 212 can use machine learning techniques to learn how the user's preference weightings vary based on context and infer the user's preference weightings based on the current context of the booking and/or the future context of the booking at the time the vehicle will be rented. The preferences component 212 can also employ crowd sourcing techniques to infer the user's contextual preference weightings based on historical preferences of other users in similar contexts.

For example, in a scenario in which the user is looking for a future vehicle rental in a ski-town during ski season, preferences component 212 can infer the user has a stronger preference weighting for a utility vehicle capable of handling snow conditions than if the user was searching for a vehicle in the same down during the summer season. In another example in which a user is searching for a BEV as soon as possible and the current weather involves rain, the preferences component 212 can determine infer the user has a stronger preference weighting for distance over times when its not raining so that the user does not have to walk as far in the rain.

The tracking component 222, the vehicle status component 224, the scheduling component 228, and the booking component 232 can provide several additional features and functionalities related to the rental vehicle booking process. In various embodiments, these components can facilitate the search component 202 in association with identifying available vehicles included in the fleet for recommending to a user as options for booking.

In this regard, with reference to FIGS. 1 and 2, the tracking component 222 can track-real time information about the vehicles 112 included in the fleet, such as but not limited to, their current location, their current operational status (e.g., in-use, driving, parked, etc.), their driving/movement patterns, and their current battery/fuel level. The tracking component 222 can also track real-time vehicle status information generated by the stations 114. For example, such status information can identify when a vehicle arrives at a station, when the vehicle departs the station, when the vehicle is undergoing cleaning, when the vehicle is undergoing maintenance, when the vehicle is undergoing refueling, and when the vehicle at the station is ready for pick-up. In embodiments involving the BEV sharing service, the station status information can identify the BEVs currently located at each charging station, their current charging state and battery level, and the number of available charging spots, the number of cars charging on the same circuit and the like. In some embodiments, the tracking component 222 can also track information regarding the ability to transfer cars between stations. For example, the tracking component 222 track supply and demand at differ stations and availability of transfer drivers (e.g., staff availability) at the different stations for transferring vehicles.

The vehicle status component 224 can regularly and/or continuously (e.g., in real-time) determine status information for all vehicles in the fleet based on the information received by the tracking component 222. In various embodiments, the status information can indicate what vehicles are available for renting at the different stations 114 at a current point in time. The status information can also indicate what vehicles are available for renting and their current status that makes them unavailable (e.g., currently rented, currently in cleaning, currently under maintenance, etc.). In some embodiments, the status information can also indicate a forecasted time at which a currently unavailable vehicle will become available for renting. With these embodiments, the vehicle status component 224 can forecast when a vehicle will become available. For example, the vehicle status component 224 can forecast when a currently rented vehicle will become available at a station based on the duration of the current booking, the scheduled return time, the scheduled return location, tracked information regarding current the location of the vehicle, the duration of cleaning time needed, duration of charging/fueling time needed, and so on.

The vehicle status component 224 can further generate dynamic vehicle status data 226 that contains the status information for all of the vehicles. The vehicle status component 224 can further regularly and/or continuously update the dynamic vehicle status data 226 as the status of each vehicle changes over time. In this regard, the status of the vehicles in fleet is constantly changing and tracked and managed by the vehicle status component 224.

The scheduling component 228 can further handle scheduling of rental vehicle bookings in a manner that ensures all existing bookings can be satisfied using the dynamic status data 226, known fleet information 218 regarding the fleet inventory, and information identifying the existing bookings and the terms of the existing bookings. This existing booking information can be maintained and managed by the booking component 232 and is represented by existing bookings data 234. As discussed in greater detail infra, the booking component 232 can control accepting and rejecting bookings based on a determination, by the scheduling component 228, that the terms of the bookings can be satisfied at booking time. This means that that the scheduling component 228 schedules bookings for vehicles in a manner that ensures all existing bookings will receive the vehicle guaranteed at booking time at the agreed upon location and for the agreed upon timeslot. As discussed in greater detail infra with reference to FIG. 9, in various embodiments, the scheduling component 228 can perform dynamic scheduling wherein existing bookings are not tied to specific vehicles. The scheduling component 228 alternatively can regularly move bookings to other vehicles and move vehicles between stations to optimize fleet utilization between the time of acceptance of a booking and the pick-up time. For example, the scheduling component 228 can maintain a dynamic schedule 230 that assigns all existing bookings to an available vehicle in accordance with the terms of the booking agreement. The scheduling component 228 can further dynamically reshuffle the schedule and reassign vehicle to the bookings over time to make room for new bookings, to account for cancelations, to account for late arrivals, to account for broken down vehicles and so on.

In this regard, in some embodiments, at the time of reception of a search request, the search component 202 can inform the scheduling component 228 regarding the required criteria for the rental vehicle booking (e.g., location, timeslot, etc.). The scheduling component 228 can further employ the dynamic status data 226, the existing bookings data 234 and the fleet information 218 (e.g., identifying all vehicles included in the fleet and their static parameters/features) to determine whether available vehicles exist or will exist (for future rentals) that satisfy the required criteria. The dynamic scheduling component 228 can further shuffle the dynamic schedule around and move vehicles between stations to open up availability for the new search request. The scheduling component 228 can further identify the available vehicles that are available, will be available and/or can be made available (e.g., by shuffling the schedule) and provide the identified available vehicles to the search component 202.

Figure 5:
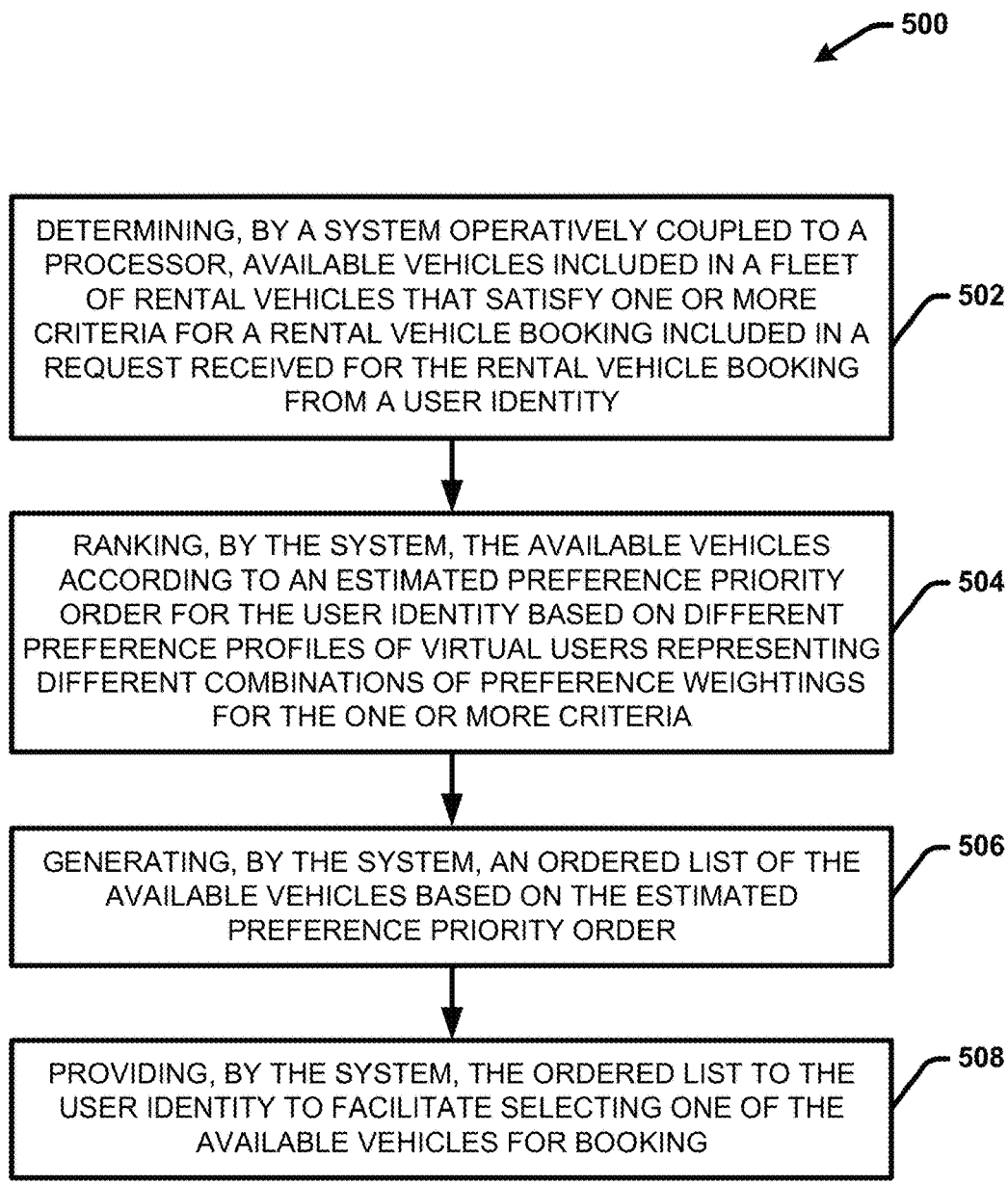
FIG. 5 illustrates a block diagram of an example, non-limiting computer-implemented method for providing diverse vehicle suggestions using virtual voters in accordance with one or more embodiments of the disclosed subject matter.

FIG. 5 illustrates a block diagram of an example, non-limiting computer-implemented method 500 for providing diverse vehicle suggestions using virtual voters in accordance with one or more embodiments of the disclosed subject matter. While, for purposes of simplicity of explanation, the methodologies described herein (e.g., method 500 and additional methods/processes described herein) are shown and described as a series of acts, the disclosed subject matter is not limited by the order of acts, as some acts can occur in different orders and/or concurrently with other acts from that shown and described herein. For example, those skilled in the art will understand and appreciate that a methodology can alternatively be represented as a series of interrelated statuses or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices. Repetitive description of like elements employed in respective embodiments is omitted for sake of brevity.

With reference to FIG. 5, at 502, a system operatively coupled to a processor (e.g., system 100), determines (e.g., via the search component and/or the scheduling component 228) available vehicles included in a fleet of rental vehicles that satisfy one or more criteria for a rental vehicle booking included in a request received for the rental vehicle booking from a user identity. At 504, the system ranks (e.g., using ranking component 206) the available vehicles according to an estimated preference priority order for the user identity based on different preference profiles of virtual users representing different combinations of preference weightings for the one or more criteria. At 506, the system generates (e.g., using recommendation component 208), an ordered list of the available vehicles based on the estimated preference priority order, and at 508, the system provides (e.g., via the results component 210) the ordered list to the user identity to facilitate selecting one of the available vehicles for booking.

Figure 6:
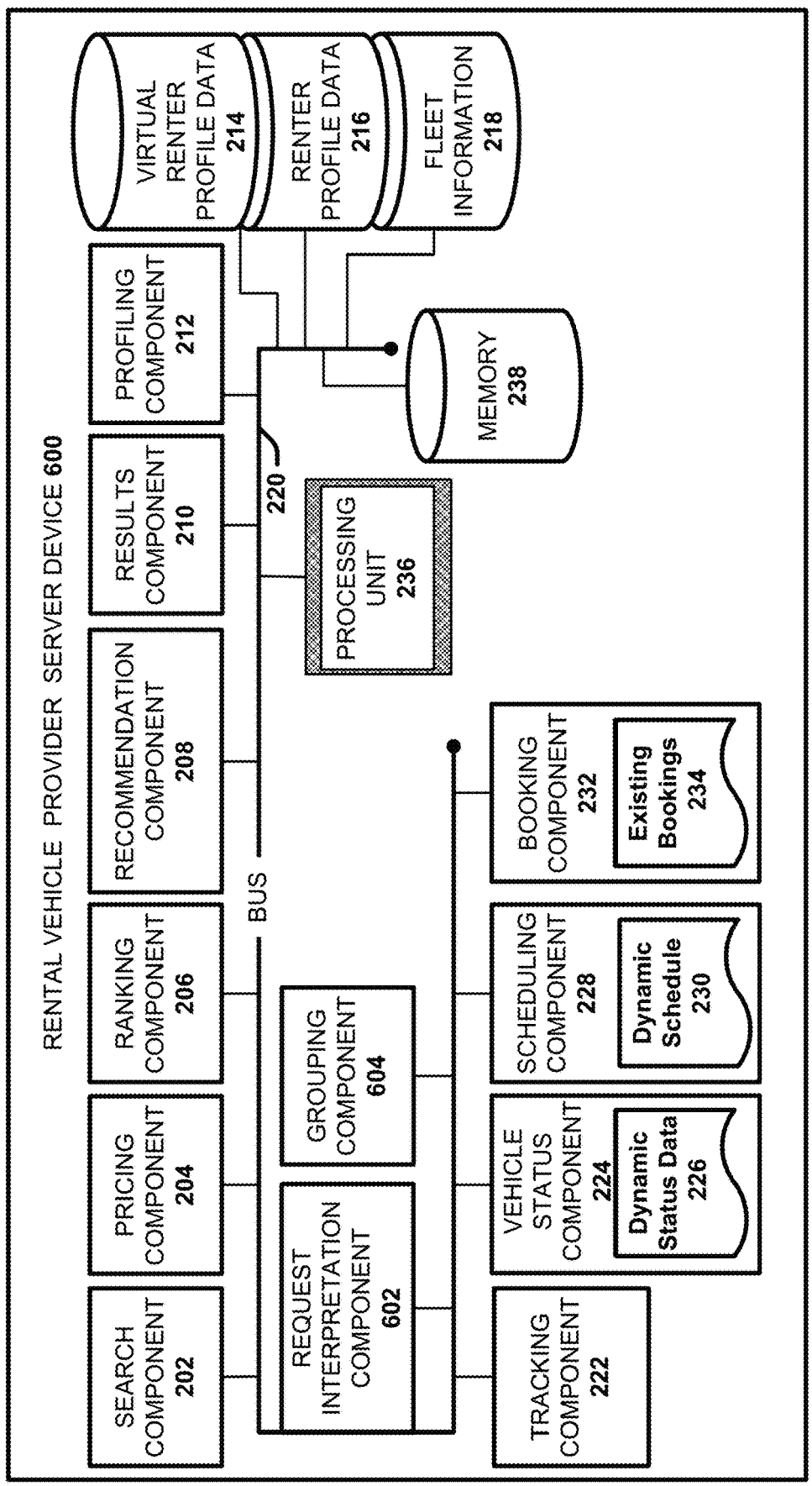
FIG. 6 illustrates a block diagram of an example, non-limiting rental vehicle provider server device that facilitates minimizing redundancy in rental vehicle search query options in accordance with one or more embodiments of the disclosed subject matter.

FIG. 6 illustrates a block diagram of an example, non-limiting rental vehicle provider server device 600 that facilitates minimizing redundancy in rental vehicle search query options in accordance with one or more embodiments of the disclosed subject matter. In various embodiments, rental vehicle provider device 600 can correspond to rental vehicle server device 108, or vice versa. Rental vehicle provider server device 600 can include same or similar components as rental vehicle provider server device 200 with the addition of preferences component 602 and grouping component 604. Repetitive description of like elements employed in respective embodiments is omitted for sake of brevity.

Similar to rental vehicle provider server device 200, rental vehicle provider server device 600 also facilities tailoring rental vehicle search results to based on inferred or known preferences of the user submitting the search query. However, in addition or alternative to providing a list of recommended available vehicles ordered based on an inferred preference order of the user, the rental vehicle provider server device 600 can refine the list of available vehicle options by grouping vehicles the user would consider "the same" booking options based on what vehicle features or properties of the available vehicles are important to the user. For example, a car might have many properties such as towbar, car model, engine, number of seats, color, etc. Assume two available vehicles of the requested model type are available, one with a towbar and one without. If the user has expressed an interest in a vehicle with a towbar, the search results can treat the two vehicles as different options. However, if the user is not interested in a towbar, the search results can group the two vehicles as the same option.

In this way, the number of options presented to the user in the search results is significantly reduced by de-duplicating options that from a purely vehicle perspective are two different types of cars, but for a specific user are seen as the same option. As a result, the user is not overwhelmed by redundant choices and the screen real-estate can be optimized with more relevant information, alternate information, advertisements and so on.

To facilitate this end, the rental vehicle server provider device 600 can include request interpretation component 602 and grouping component 604. In one or more embodiments, the request interpretation component 604 can determine or infer the user's preferences relative to a received search request regarding what vehicle properties/features the user considers important or differentiable when choosing between different rental vehicles. For example, the search component 202 can receive a booking request identifying one or more required criteria for the booking. The search component 202 (and/or or the scheduling component 228) can further identify available vehicles that satisfy the required search criteria. These available vehicles can have a variety of properties (or features and/or parameters. The request interpretation component 602 can perform the task of determining which, if any, of the properties associated with the available vehicles are important or relevant to the user to an extent that the user would consider the feature when determining which car to pick. In this context, available vehicle properties (or features, or parameters) that the request interpretation component 602 determines or infers to be important to the user are referred to herein as "relevant properties," (or "relevant features, "relevant parameters," etc.)

In some embodiments, the rental vehicle booking/search request can identify or indicate one or more relevant properties (e.g., as preferred properties). In other embodiments, the request interpretation component 602 can determine the relevant properties based on profile data and/or rental history data for the user provided in the renter profile data 216. For example, in some implementations, the rental profile data 216 can identify or indicate what vehicle properties are relevant to the user in different contexts. The request interpretation component 602 can further infer if there are any relevant features associated with a new booking request based on the user defined required criteria, the user's profile data, the user rental history, and other contextual factors associated with the receive request. In this regard, even if the booking request does not explicitly identify the relevant parameters, the request interpretation component 602 an evaluate the request to infer if any vehicle features are relevant to the user for the current request that the user assume the system would account for. The request interpretation component 602 can employ various machine learning techniques to infer relevant properties associated with a current booking request based on the user defined required criteria, the user's profile data, the user rental history, and other contextual factors associated with the receive request. Additionally, or alternatively, the preferences component 212 can determine or infer, or facilitate determining or inferring, the relevant properties using one or more machine learning techniques (e.g., as describe above with reference to FIG. 2).

The grouping component 604 can further group the available vehicles into one or more booking options based on whether the one or more properties of the available vehicles are determined to relevant to the user. In this regard, the grouping is done by the properties that are relevant for the user while properties that are not relevant are ignored. The results component 210 can further generate a search result list for presenting to the user comprising the one or more booking options.

For example, based on a determination that a certain property is relevant to the user, the grouping component can distinguish vehicles that have the property from vehicles that don't have the property. In some implementations, the grouping component 604 can group vehicles tougher that have the property as a first booking option and group the other vehicles together that do not have the property as a second booking option. In another implementation, based on a determination that a property of at least one of the available vehicles is not relevant to the user, the grouping component 604 can group the available vehicles having the property and not having the property as into a single booking option. In another implementation, based on a determination that no vehicle properties other than the one or more criteria are relevant to the user, the grouping component 604 can group all the available vehicles into a single booking option. Additionally, or alternatively, the grouping component can group the available vehicles by station.

In implementations in which a booking option includes a group of vehicles, the results component 210 can summarize the option information based on the reason for grouping the vehicles together into the option while remove extraneous information. In this the results component 210 can generate a concise summary regarding the scope of the vehicles included in each booking option based on the properties associated with each option that are relevant to the user. For example, if a booking option include a first booking option containing a single available vehicle with a relevant vehicle feature (e.g., a towbar) and a second booking option with several other available vehicles that do not include the relevant vehicle feature, the results component 210 can summarize the first booking option as "First option=a vehicle matching your search criteria with a towbar," and the second booking option as, "Second option=other vehicles matching your search criteria that do not include a towbar." The results component 210 can further remove any additional information about the vehicle included in the first option and the vehicles included in the second option that were not otherwise considered relevant. The result component 210 can alternatively provide the additional information in response to selection of the first option or the second option. For example, based on selection of the first option, the results component 210 can provide additional details regarding the make/model of the first vehicle and various other features about the first vehicle. Similarly, based on selection of the second option, the results component can provide a list of the vehicles included in the second option and their additional features.

In some embodiments, the request interpretation component 602 can be configured to determine the relevant properties based solely on whether they are identified in the booking request. In this manner, the rental vehicle provider server device 600 can respond to the user in the way that they ask the question with the most relevant information. In this regard, the less specific the question, the less specific the search results. For example, assume the booking request merely indicates the user wants a car in Stockholm. A standard response to this broad search request would list all the available vehicles at all the stations in Stockholm. These search results could include many different car models in two or more stations that are the same models just at different location, providing too many redundant choices. With the disclosed techniques, the grouping component 604 can group be configured to group the available cars based on the station. For example, the grouping component 604 can group all available cars at the first station into one booking option, all available cars at the second station into a second booking option, and so on. The results component 210 can further generate a summary of each booking option that identities each station and indicates that many different vehicles are available at each station (e.g., Option 1="Station A, many available vehicle models," Option 2="Station B, many available vehicle models . . . " etc.). In another example, if the search request indicates the user is interested in a vehicle with a towbar, instead of the results listing all cars in station A with a towbar, the results component 210 can consolidate the booking option as stating: "Station A has a car available with a towbar."

Figure 7:
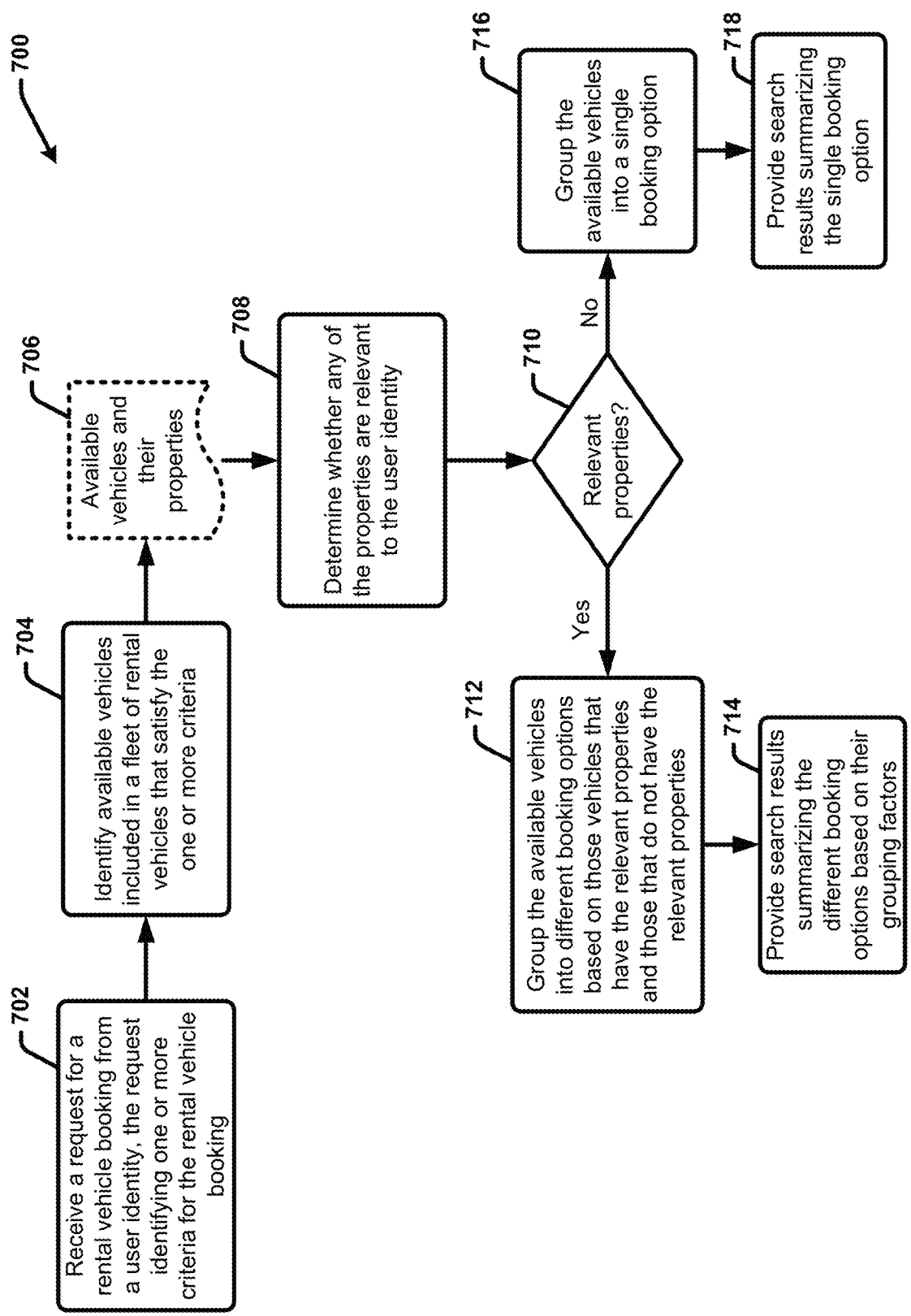
FIG. 7 provides a flow-diagram of an example process for grouping redundant available rental vehicle options in accordance with one or more embodiments of the disclosed subject matter.

FIG. 7 provides a flow-diagram of an example process 700 for grouping redundant available rental vehicle options in accordance with one or more embodiments of the disclosed subject matter. In accordance with process 700, at 702 the search component 202 can receive a request for a rental vehicle booking from a user identity (e.g., an identity of the person/entity from which the search request was received), the request identifying one or more criteria for the rental vehicle booking (e.g., location, timeslot, etc.). At 704, the search component 202 and/or the scheduling component 228 can identify the available vehicles included in the fleet that satisfy the one or more search criteria. For example, the search component can treat the one or more criteria as required criteria and identify all available vehicles that satisfy the required criteria. Information identifying the available vehicles and their properties generated by and/or provided (e.g., by the scheduling component 228) to the search component 202 is represented in process 700 as available vehicle information 706.

At 708, the request interpretation component 602 can determine or infer whether any of the properties of the available vehicles are relevant to the user identity. For example, in some implementation, the request interpretation component 602 can determine whether any of the properties are relevant based on inclusion of the properties in the search request as preferred properties. Additionally, or alternatively, the request interpretation component 602 can determine whether any of the properties are relevant based on inclusion of the properties as preferred properties in user profile information for the user identity. Still in other implementation, the request interpretation component 602 can employ one or more machine learning techniques to infer whether any of the properties are relevant based user profile information for the user, historical rental vehicle booking information from the user, and/or a context of the booking request (e.g., based on location for the booking, a time for the booking, weather conditions associated with the booking, traffic associated with the time of the booking, etc.).

At 710, if the request interpretation component 602 determines or infers that one or more of the properties are relevant, that at 712, the grouping component 704 can group the available vehicles into different booking options based on those vehicles that have the relevant properties (or property), and those vehicles that do not have the relevant properties (or property). At 714, the result component 210 can further provide search results summarizing the different booking options based on their grouping factors. In this way, the results component 210 can distinguish between the available vehicles that have the relevant properties and the available vehicles that do not have the relevant properties in the search results. However, if at 710, if the request interpretation component 602 determines or infers that none of the properties are relevant, that at 716, the grouping component 704 can group the available vehicles into a single booking option. At 718, the result component 210 can further provide search results summarizing the single booking option. In some implementations in which the available vehicles are located at different stations, the grouping component 704 can alternatively generate different booking options for each station. For example, a first option can state: "We have available vehicles matching your criteria at station A;" a second booking option can state: "We have available vehicles matching your criteria at station B," and so on.

Figure 8:
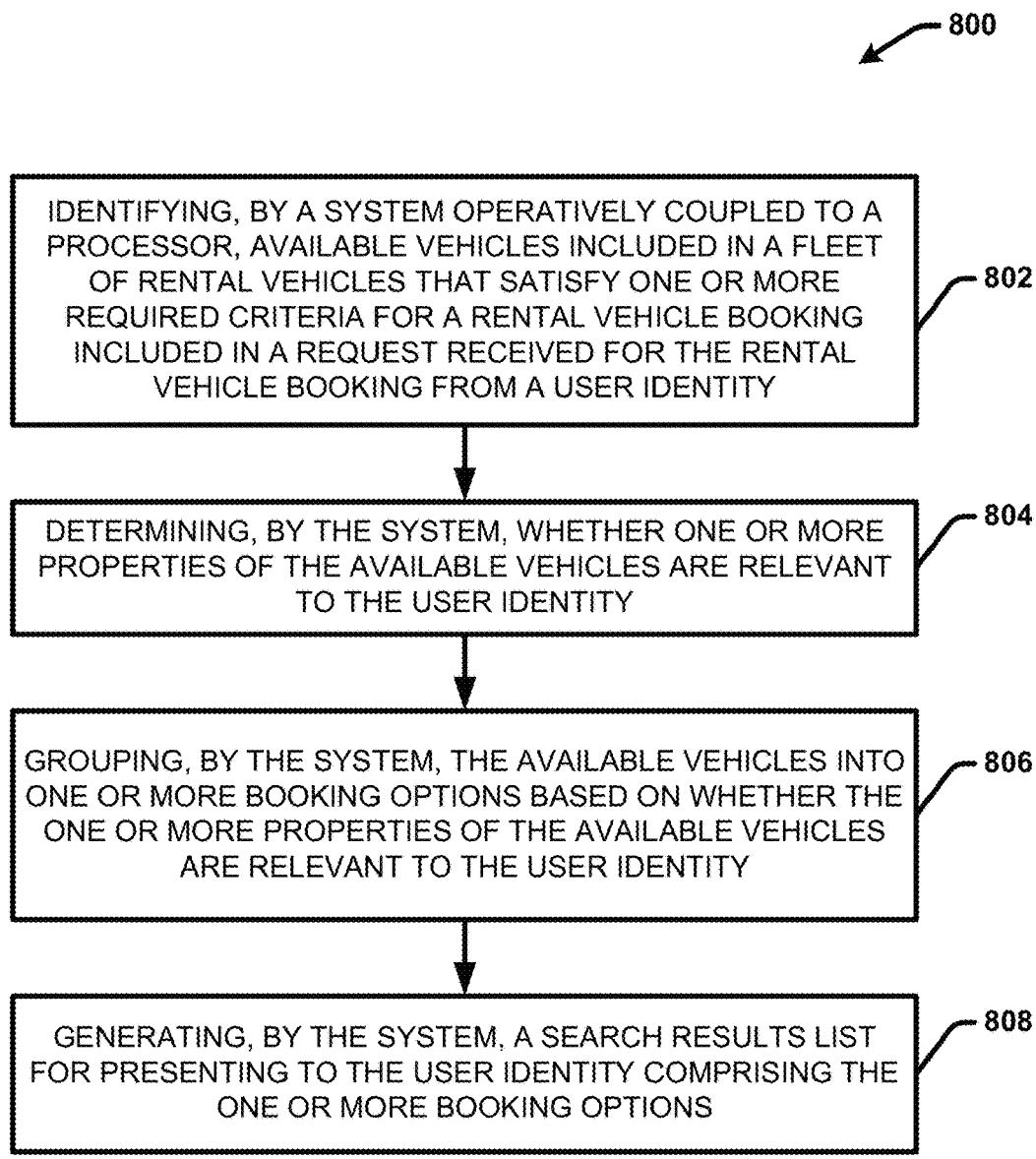
FIG. 8 illustrates a block diagram of an example, non-limiting computer-implemented method for minimizing redundancy in rental vehicle search query options in accordance with one or more embodiments of the disclosed subject matter.

FIG. 8 illustrates a block diagram of an example, non-limiting computer-implemented method 800 for minimizing redundancy in rental vehicle search query options in accordance with one or more embodiments of the disclosed subject matter. Repetitive description of like elements employed in respective embodiments is omitted for sake of brevity.

At 802, method 800 includes identifying, by a system operatively coupled to a processor (e.g., system 100), available vehicles included in a fleet of rental vehicles that satisfy one or more required criteria for a rental vehicle booking included in a request received for the rental vehicle booking from a user identity (e.g., using search component 202 and/or scheduling component 228). At 804, method 800 comprises determining, by the system, whether one or more properties of the available vehicles are relevant to the user identity (e.g., using request interpretation component 602). As discussed above, these properties can encompass any vehicle booking parameter and/or vehicle feature that is not indicated as required criteria in the booking/search request. For example, in some implementations, the request interpretation component 602 can evaluate the request to determine whether the user has indicated any preferred vehicle booking parameters and/or vehicle features. In other implementations, the request interpretation component 602 whether there are relevant features to the user based on their rental profile data 216, using the preferences component and/or using one or more machine learning techniques. At 806, the method can further comprise grouping, by the system, the available vehicles into one or more booking options based on whether the one or more properties of the available vehicles are relevant to the user identity (e.g., via grouping component 604). At 808, method 800 can further comprise generating, by the system, a search results list for presenting to the user identity comprising the one or more booking options (e.g., using results component 210).

Figure 9:
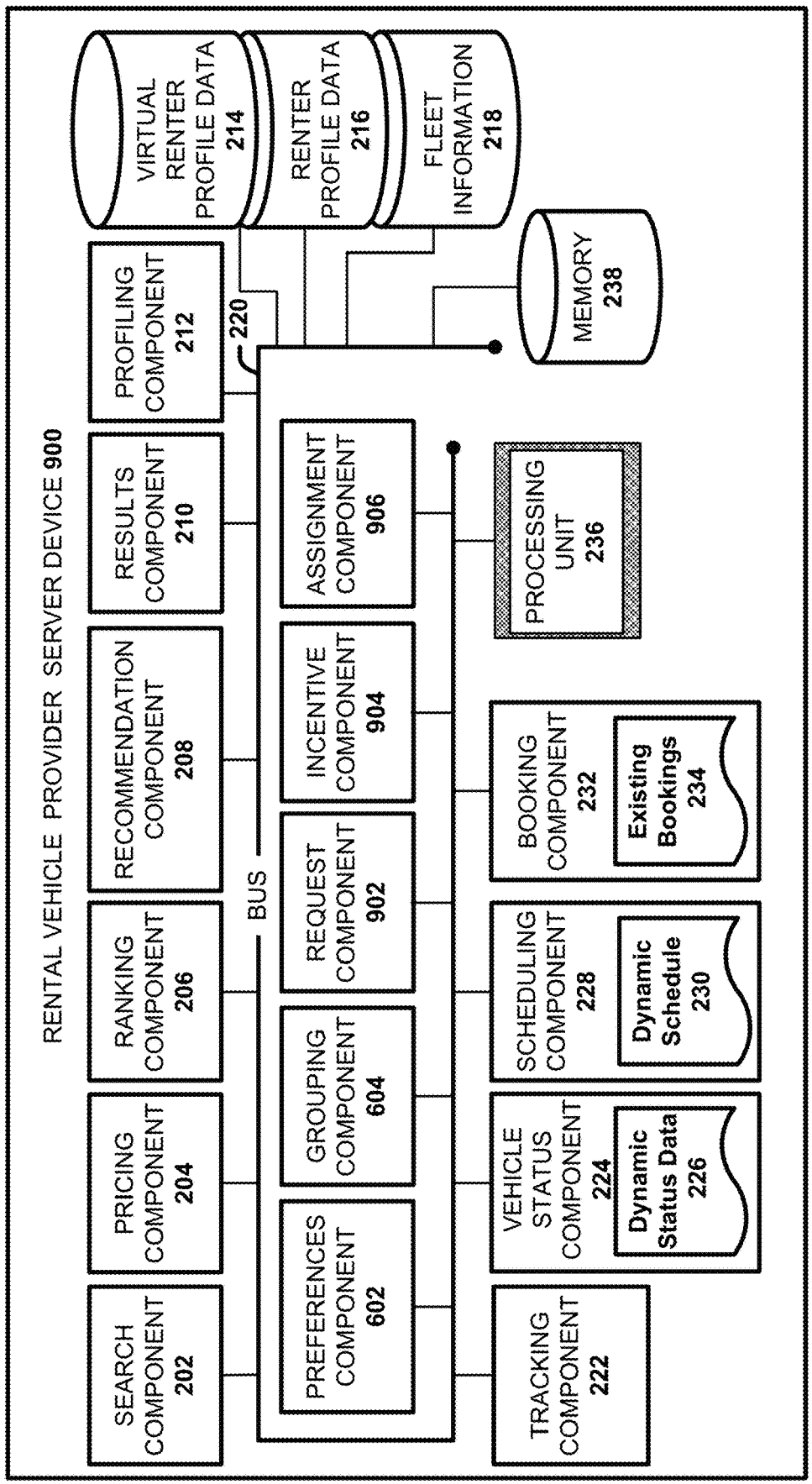
FIG. 9 illustrates a block diagram of an example, non-limiting rental vehicle provider server device that facilitates dynamic vehicle scheduling in accordance with one or more embodiments of the disclosed subject matter.

FIG. 9 illustrates a block diagram of an example, non-limiting rental vehicle provider server device 900 that facilitates dynamic vehicle scheduling in accordance with one or more embodiments of the disclosed subject matter. In various embodiments, rental vehicle provider device 900 can correspond to rental vehicle server device 108, or vice versa. Rental vehicle provider server device 900 can include same or similar components as rental vehicle provider server device 600 with the addition of request component 902, incentive component 904 and assignment component 906. Repetitive description of like elements employed in respective embodiments is omitted for sake of brevity.

As mentioned with reference to FIG. 2, in various embodiments, the scheduling component 228 can perform dynamic scheduling of rental vehicle bookings, wherein bookings are not tied to specific vehicles in the fleet prior to pick-up. Instead, the booking component 232 can be configured to accept or reject new bookings based on whether the scheduling component 228 can create an acceptable schedule containing the new booking and all existing bookings.

In this regard, the booking component 232 can maintain a list of existing bookings 234 that identifies existing rental vehicle bookings and their terms. The terms of the existing bookings can include the agreed upon and accepted criteria/parameters for the rental vehicle booking, such as the agreed upon location, timeslot, vehicle type, and so on. The agreed upon criteria/parameters can vary and can include any number of the various static and dynamic parameters associated with rental vehicle bookings discussed herein. The scheduling component 228 and the assignment component 906 can treat the agreed upon terms of these existing bookings 234 as fixed or required criteria when scheduling and assigning the bookings to available vehicles.

The existing rental vehicle bookings can include any rental vehicle booking accepted for a future time (e.g., bookings not yet initiated) and bookings that have been initiated yet not completed (e.g., the rental vehicle is currently rented out and not yet returned). The scheduling component 228 can further dynamically assign and reassign existing bookings 234 to vehicles in a manner that ensures the existing bookings 234 can be fulfilled in accordance with the agreed upon terms (e.g., agreed upon timeslot, location, vehicle type, vehicle properties, etc.) in order to maximize fleet utilization while minimizing losses in an environment in which the status of the vehicles in the fleet is always changing.

For example, the scheduling component 228 can maintain a dynamic schedule 230 that schedules all existing bookings 234 to an available vehicle in accordance with the terms of the existing bookings. This dynamic schedule 230 of vehicle assignments to the existing bookings ensures the fixed criteria of the existing bookings can be fulfilled. For example, in an implementation in which the fixed criteria include a rental vehicle type and a rental timeslot, the dynamic schedule 230 ensures the requested vehicle type is available for the requested timeslot. In another example, in implementations in which the fleet is distributed between different stations, the dynamic schedule 230 of vehicle assignments ensures a requested vehicle type is available for a requested timeslot at a requested station of the different stations. With these implementations, the scheduling component 228 can rearrange the dynamic schedule by determining one or more movements of the rental vehicles between the different stations that results in ensuring the requested vehicle type is available for the requested timeslot at the requested station.

In this regard, the scheduling/assignment of a booking to an available vehicle in the dynamic schedule 230 refers to assignment of the booking to a vehicle that will have an available status at the time of initiation of the booking and will be available for the agreed upon duration of the booking, at the agreed upon location of the booking, and will be the agreed upon type of vehicle. The scheduling component 228 can employ dynamic status data 226 to determine or facilitate determining current and future availability status of vehicles in the fleet. The scheduling component 228 can further adjust the dynamic schedule 230 by rearranging the vehicle assignments to account for the dynamic state of the rental vehicle system in a manner that minimizes cost attributed to utilization of the fleet and minimizes an amount of unfulfilled booking requests for the rental vehicles. The scheduling component 228 can also schedule movement of vehicles between stations in association with adjusting the vehicle assignments.

In various embodiments, the scheduling component 228 can adjust the dynamic schedule 230 to open-up vehicles for new bookings, thereby maximizing fleet utilization. With these embodiments, the scheduling component 228 can adjust the dynamic schedule as needed in response to reception of a new booking request to open up an available vehicle for the booking request and/or to optimize the current assignment of the vehicles to the existing bookings and the new booking in a manner that maximizes fleet utilization (e.g., minimizes time in which vehicles are not rented). The scheduling component 228 can also adjust the dynamic schedule 230 to account for cancellations of existing bookings or requested changes to existing bookings. For example, the requested changes can include changes to the agreed upon terms (e.g., a change in agreed pick-up/drop-off time, location, vehicle type, etc.). In various embodiments, the request component 902 can provide for receiving requests for booking cancellations and changes to existing bookings. The scheduling component 228 can also adjust the dynamic schedule 230 to account for changes in the status of the rental vehicles over time (e.g., as reflected in the dynamic status data 226). For example, the scheduling component 228 can adjust the dynamic schedule 230 to account for vehicles breaking down or requiring maintenance, vehicles being added to the system, vehicles being returned late and early, vehicles being picked up late and early, booking cancellations, current and forecasted fuel/battery levels, and so on.

Figure 10:
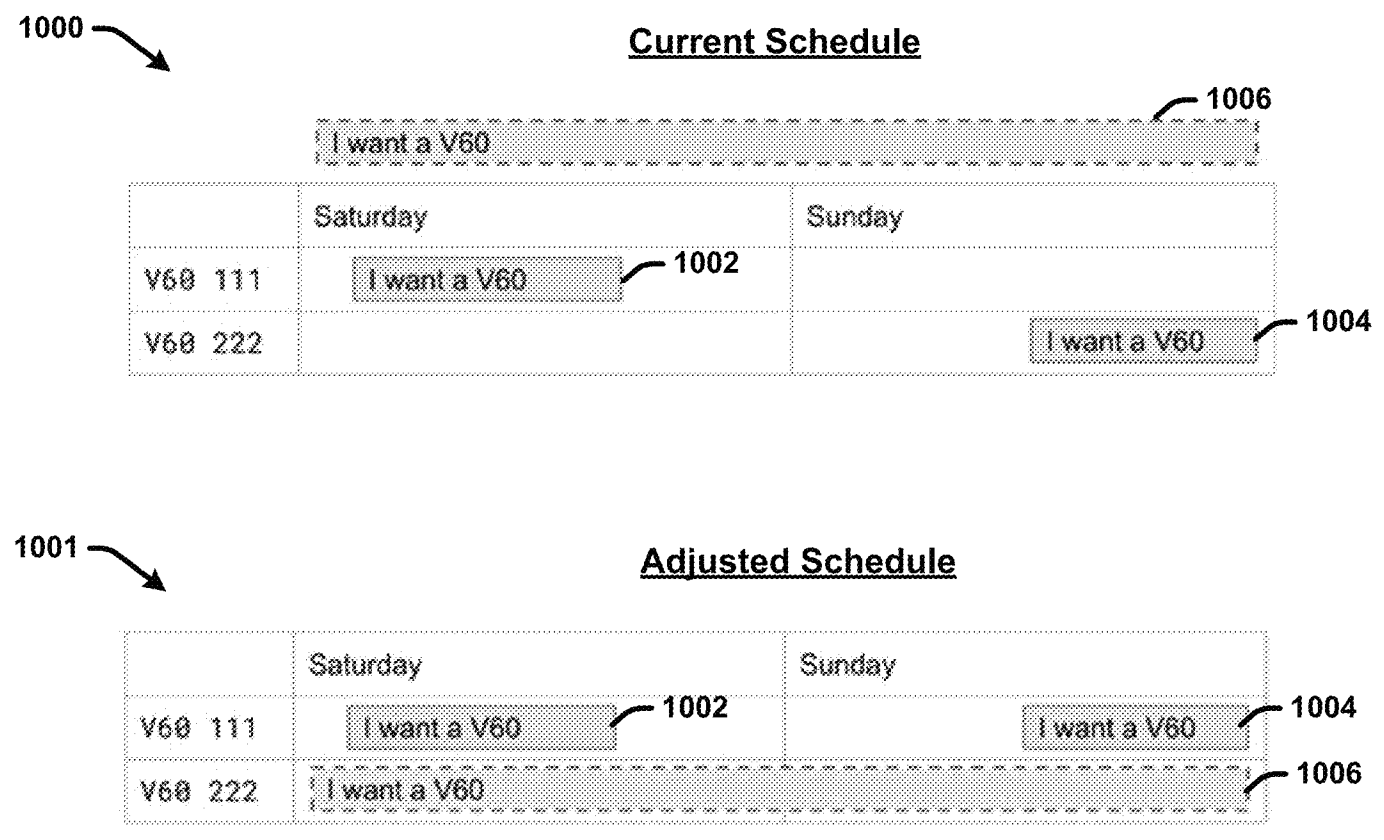

For example, FIG. 10 illustrates dynamic scheduling of rental vehicle bookings in association reception of a new booking request in accordance with one or more embodiments of the disclosed subject matter. FIG. 10 presents a first chart 1000 comprising a current schedule of vehicle assignments and a second chart 1001 comprising an adjusted schedule. With reference to FIGS. 9 and 10, in the example shown in FIG. 10, both the current schedule and the adjusted schedule correspond to the dynamic schedule 230. The current schedule includes two exiting bookings, respectively identified as first existing booking 1002 and second existing booking 1004. Each of the existing bookings require a V60 type vehicle for about a half day (e.g., 12 hour) timeslot, one on Saturday and the other on Sunday. The current schedule assigns the first existing booking 1002 to V60 vehicle number 111 and the second existing booking 1004 to V60 vehicle number 222.

In this example, the new booking request 1006 is represented by the dashed box. The new booking request 1006 also includes a request for a V60 type vehicle for a timeslot including all of Saturday and Sunday. As can be seen with reference to the first chart 1000, the current schedule does not provide room for assigning the new booking request 106 to an available V60 vehicle (e.g., the dashed box for the new booking request 1006 does not fit into the current schedule). However, the current schedule can be adjusted by moving the second existing booking 1004 to V60 number 111 on Sunday, resulting in opening up V60 number 222 for the timeslot of the entirety of Saturday and Sunday for the new booking request.

In accordance with this example, when responding to the new booking request, the results component 210 can provide a response to the new booking request 1006 indicating there is an available vehicle for the request based on a determination (e.g., by the scheduling component 228) that the adjusted schedule 1001 can be created. The booking component 232 can further only accept the new booking request 1006 based on a determination that the adjusted schedule 1001 can be created that satisfies the existing bookings and the new booking request. In this regard, in some embodiments, in response to acceptance of the booking request, the adjusted schedule 1001 will become the current schedule. In some embodiments, if the user providing the new booking request 1006 however does not ultimately choose to complete the booking, the scheduling component 228 can keep the current schedule. Alternatively, the scheduling component 228 can maintain the adjusted schedule despite the user not completing the booking.

Figure 11:
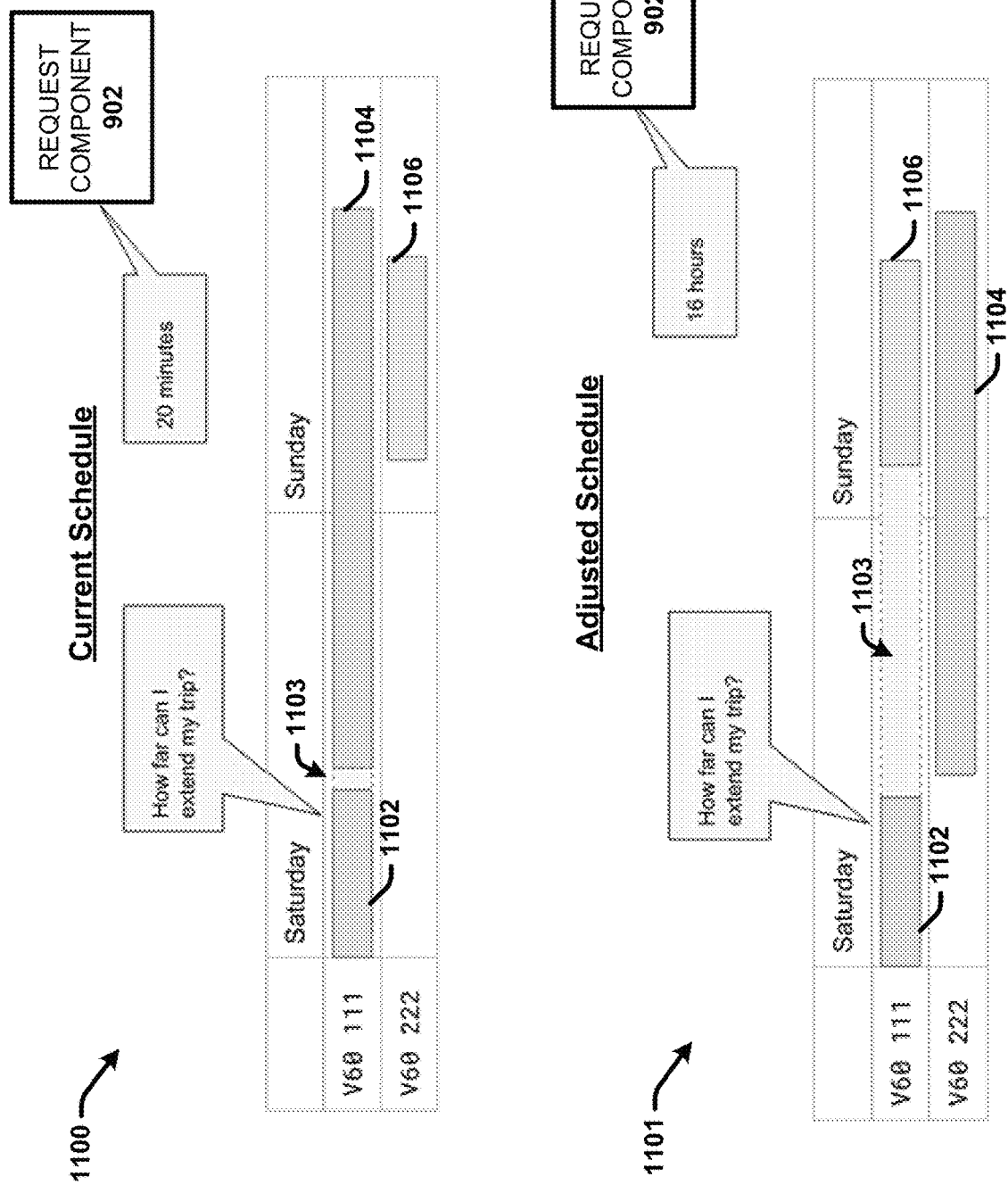
FIG. 11 illustrates dynamic scheduling of rental vehicle bookings to accommodate a booking extension in accordance with one or more embodiments of the disclosed subject matter.

FIG. 11 illustrates dynamic scheduling of rental vehicle bookings to accommodate a requested change to an existing booking in accordance with one or more embodiments of the disclosed subject matter. With reference to FIGS. 9 and 11, in various embodiments, the request component 902 can receive request for changes to existing bookings, including bookings that have not yet been initiated as well as bookings that are currently underway. In this example, the change requested involves a request for an extension of time to an existing booking, first existing booking 1102.

In this regard, similar to FIG. 10, FIG. 11 provides a first chart 1100 corresponding to a current schedule and a second chart 1101 corresponding to an adjusted schedule. Both the current schedule and the adjusted schedule can correspond to the dynamic schedule 230. The current schedule includes existing bookings for a V60 type vehicle over Saturday and Sunday, including a first existing booking 1102 for a portion of Saturday, a second existing booking 1104 for a portion of Saturday and Sunday, and a third existing booking 1106 for a portion of Sunday.

In this example, the request component 902 receives a request asking how long the first existing booking 1102 can be extended. As shown in chart 1100, with the current schedule, the second existing booking 1104 is scheduled for the same vehicle as the first existing booking 1102, V60 vehicle number 111, just 20 minutes after the first existing booking 1102, making the amount of time 1103 available for the extension only 20 minutes. However, with dynamically scheduling, the scheduling component 228 can adjust the current schedule by moving the second existing booking 1104 to V60 vehicle number 222 on Saturday and Sunday and moving the third existing booking 1106 to V60 vehicle 111 on Sunday, as shown in the second chart 1101. This adjustment changes the amount of time 1103 available for the extension of the first existing booking 1102 from 20 minutes to 16 hours.

In this regard, in response to reception of a booking extension request, the scheduling component 228 can determine how to adjust the schedule to provide the maximum amount of time for extension. The request component 902 can further respond to the booking extension request with an answer determined based on the adjusted schedule as opposed to the current schedule. For instance, in accordance with this example, the results component 210 can inform the user associated with the first existing booking 1102 that they can extend their booking up to 16 hours. The scheduling component 228 can further keep the current schedule or proceed with the adjusted schedule based on whether the user accepts an extension for more than 20 minutes. Alternatively, the scheduling component 228 can maintain the adjusted schedule despite the user not following through with the extension.

In the examples shown in FIGS. 10 and 11, the scheduling component 228 adjust the dynamic schedule 230 in response to reception of a new booking request and a change to an existing booking request. However, the scheduling component 228 is not limited to adjusting the dynamic schedule 230 in response to these events. Addition, the scheduling component 228 can regularly and/or continuously adjust the dynamic schedule 230 in real-time based on various other dynamic factors to maximize fleet utilization (or minimize downtime in which vehicles are not rented out), minimize costs for the rental vehicle provider, maximize profits for the rental vehicle provider, and maximize customer satisfaction using one or more predefined optimization models (e.g., loss functions). For example, these dynamic factors can include changes in current and forecasted availability status of the vehicles in the fleet (e.g., as determined based on the dynamic status data 226), which can change dynamically based on vehicles being returned late/early, vehicles picked up late/early, vehicles being pick-up/returned at alternate locations (e.g., relative to their scheduled pick-up/return location), bookings being canceled, vehicles breaking down, vehicles requiring maintenance/cleaning, new vehicles being added, and so on. These dynamic factors can also include current and forecasted fuel/battery levels of the vehicles in the fleet. In some embodiments, in association with rearranging the dynamic schedule 230, the scheduling component 228 can also schedule movement of vehicles between stations. With these embodiments, the one or more optimization models can account for movement of the vehicles between the stations.

In this regard, the scheduling component 228 can regularly and/or continuously adjust the dynamic schedule using one or more optimization models to generate different scheduling options of assignments of exiting bookings 234 to available vehicles that result in achieving one or more predefined goals (e.g., maximizing fleet utilization or minimize downtime in which vehicles are not rented out, minimizing costs for the rental vehicle provider, maximizing profits for the rental vehicle provider, and maximize customer satisfaction). In some embodiments, the one or more optimization models can weight and balance these different goals to converge on the dynamic schedule 230. With these embodiments, the dynamic schedule 230 represents the "most optimal" assignment of available rental vehicles to the existing bookings 234 based on the current and forecasted state of the rental vehicle system.

Additionally, or alternatively, the one or more optimization models can generate different scheduling options that achieve one or more of these goals while satisfying the terms of the existing bookings 234. In this regard, the scheduling component 228 can generate different options for adjusting the dynamic schedule 230 that satisfy the terms of the existing bookings 234. For example, the scheduling component 228 can adjust the dynamic schedule 230 in various ways with different permutations and/or combinations of vehicle assignments for the existing bookings, wherein each of the different versions of the dynamic schedule 230 satisfy the terms of the existing bookings 234 yet assign different combinations of the available vehicles to the existing booking 234. With these embodiments, the assignment component 906 can use the different scheduling options to further optimize final vehicle assignments closer to the time of pick-up, as discussed below.

In some implementations of these embodiments, the scheduling component 228 can be configured adjust the dynamic schedule 230 in various ways that results in opening up different available vehicle options for satisfying a new booking request. For example, based on reception of a new booking request, the scheduling component 228 can determine different assignments of available vehicles for the existing bookings 234 and the new booking request, wherein each of the different assignments results in different available vehicle options. With these embodiments, the scheduling component 228 can aggregate the different available vehicle options for provision to the search component 202 in association with responding to the new booking request. For instance, rather than providing the search component 202 with available vehicle options based on a single scheduling arrangement, the scheduling component 228 can provide the search component 202 with available vehicle options that account for all (or some) of the different possible scheduling arrangements that can be made which satisfy the criteria for the existing bookings 234 and the new booking request. The scheduling component 228 can further adjust the schedule based on the vehicle option selected for the new booking request and the scheduling arrangement that best achieves the one or more goals of the system.

For instance, assume a first scheduling arrangement provides vehicle options 1 and 2, a second scheduling arrangement provides vehicle options 1 and 3, a third scheduling arrangement provides vehicle option 4 and so on. With this example, the scheduling component 228 can provide the search component 202 with available vehicle options 1, 2 3 and 4. If the user selects vehicle option 4, then the scheduling component 228 can adjust the dynamic schedule 230 according to the third scheduling arrangement. If the user selects vehicle option 1, the scheduling component 228 can chose either the first scheduling option or the second scheduling option, whichever best maximizes fleet utilization, minimizes costs, and so on.

In some embodiments, the scheduling component 228 can be authorized to make adjustments to agreed upon terms of existing bookings 234 to optimize the dynamic schedule 230, maximize the number of unfulfilled booking requests and booking change requests, and resolve conflicts between existing bookings 234 that arise due to uncontrollable variables (e.g., weather, flight delays/cancellations, vehicle maintenance needs, etc.). For example, the scheduling component 228 can be authorized to make reasonable adjustments to agreed upon criteria of an existing booking, such as reasonable adjustments in pick-up/drop-off time, reasonable adjustments in vehicle type, reasonable adjustments in pick-up/drop-off location, and so on. With these embodiments, the boundaries of reasonable adjustments can be predefined. For example, the scheduling component 228 can be authorized to adjust existing booking timeslots according to defined time adjustment rules, adjust existing booking locations according to defined location adjustment rules, adjust existing booking vehicle type/model according to defined vehicle type adjustment rules, and so on.

In some implementations of these embodiments, the rental vehicle provider server device 900 can include incentive component 904 to provide incentives to renters of the existing bookings for accepting changes to their booking terms. The incentives can include monetary incentives (e.g., refunds, discounts, coupons, etc.), vehicle upgrade incentives, and other types of gifts and rewards. For example, the scheduling component 228 can determine an adjustment to one or more terms of an existing rental vehicle booking that results in optimizing the dynamic schedule, results in opening an available vehicle for a new booking request, and/or results in an ability to fulfil a requested change to an existing booking. The incentive component 904 can further provide the user of the existing booking with a notification/prompt asking the user if they would accept the adjustment in exchange for an incentive (e.g., a discount, a coupon, a gift, etc.). The scheduling component 228 can further make the adjustment based on acceptance of the incentive. In some implementation, the type of incentive and/or the value of the incentive can vary based on the adjustment.

The manner for identifying which existing bookings to adjust can vary. In some implementations, the scheduling component 228 can be configured to determine which existing booking or bookings to adjust based on the adjustment or adjustments being associated with the least cost (e.g., least disruptive and least costly) with the adjustment being within the defined bounds of a reasonable adjustment.

Additionally, or alternatively, the scheduling component 228 can be configured to determine which existing booking or bookings to adjust based on an inferred probability/ likelihood that the user would accept the incentive offer for the adjustment. With these embodiments, the scheduling component 228 can be authorized to make an adjustment to an existing booking only in response to acceptance of the incentive offer. The scheduling component 228 can thus determine adjustments to existing bookings that are likely to be accepted (relative to a defined acceptance probability threshold) while forgoing adjustments to existing bookings that are unlikely to be accepted (relative to a defined acceptance probability threshold). The incentive component 904 can employ various machine learning techniques to determine the acceptance probabilities based on a degree of disruption of the adjustment (e.g., which can vary based on context of the rental vehicle booking), historical user acceptance of incentive offers, the value/amount of the incentive, and so on.

In some implementations of these embodiments, the scheduling component 228 can determine adjustments to a subset of the existing bookings 234 that would achieve the desired goal (e.g., opening up vehicles for a new booking, optimizing the dynamic schedule 230, allowing for a change request, resolving conflicts between existing bookings, etc.). The incentive component 904 can further determine incentive offers for providing to the users of the existing bookings for accepting the adjustments and determine the probabilities that the users would accept the incentive offers. The incentive component 904 can further rank the incentive offers based their associated acceptance probabilities from highest to lowest and provide the users with the incentive offers in an order based on the acceptance probabilities.

As discussed above, the scheduling component 228 can regularly and/or continuously adjust vehicle assignments to existing bookings 234 between the time of acceptance of the booking and the time of pick-up of the rental vehicle. This time period can vary depending on how far in advance a user makes the rental vehicle booking (e.g., from within the hour to days, weeks or even months ahead of time). In some embodiments, the assignment component 906 can provide for assigning the final rental vehicle to an existing booking within a defined timeframe close to the pick-up time (e.g., 1 day, 1 hour, 30 minutes, etc.). The assignment component 906 can perform smart car assignment by deciding which car to server to customer close to the booking start time based on the available vehicles that satisfy the required booking criteria and various other parameters to optimize for both a good customer experience as well as operational experience. For example, the other parameters can include, but are not limited to, current fuel/battery level, battery consumption rates, cleanliness, user preferences, user needs, customer loyalty (e.g., and earnings of upgrades), and respective supply and forecasted demand for the available vehicles.

Figure 12:
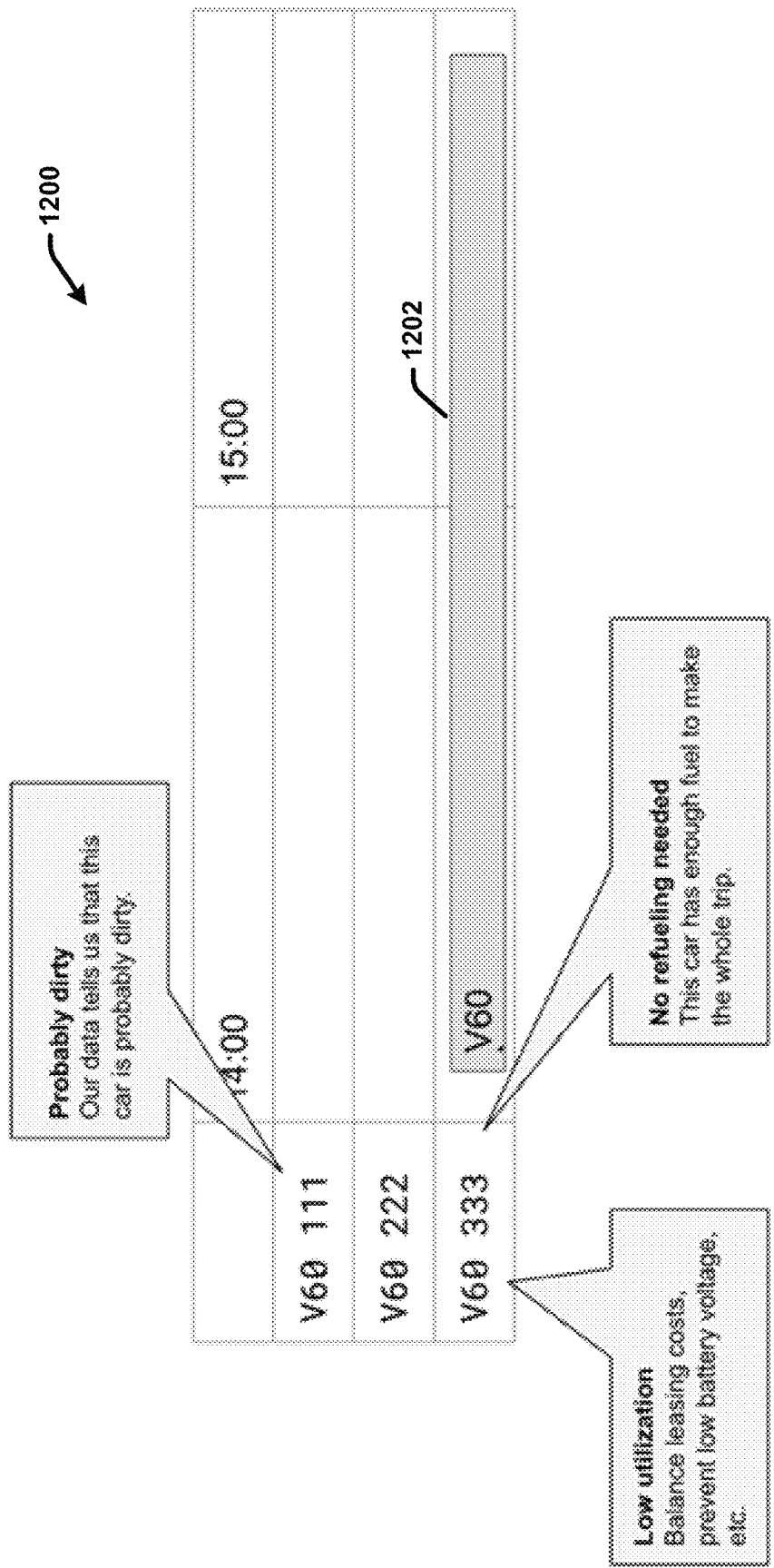
FIG. 12 illustrates smart vehicle assignment in accordance with one or more embodiments of the disclosed subject matter.

For example, FIG. 12 illustrates smart vehicle assignment in accordance with one or more embodiments of the disclosed subject matter. With reference to FIGS. 9 and 12, FIG. 12 presents a vehicle assignment chart 1200 for assigning available vehicles to an existing booking 1202 for a timeslot starting at around time 14:10 and ending at around time 15:50 (e.g., a 1 hour timeslot). In this example, as indicated by the dynamic status data 226, there are three available vehicles that satisfy the booking criteria (e.g., being a V60 type vehicle and being available for the rental timeslot) within the final assignment booking window used by the assignment component 906 (e.g., within 30 minutes of pick-up). In this scenario, the assignment component 906 can employ smart car assignment to determine which of the three vehicles to assign to the existing booking 1202 based on various additional criteria aside from the booking terms. In this example, the criteria used to differentiate between the three available vehicles included cleanliness, battery utilization, and refueling needs.

Figure 13:
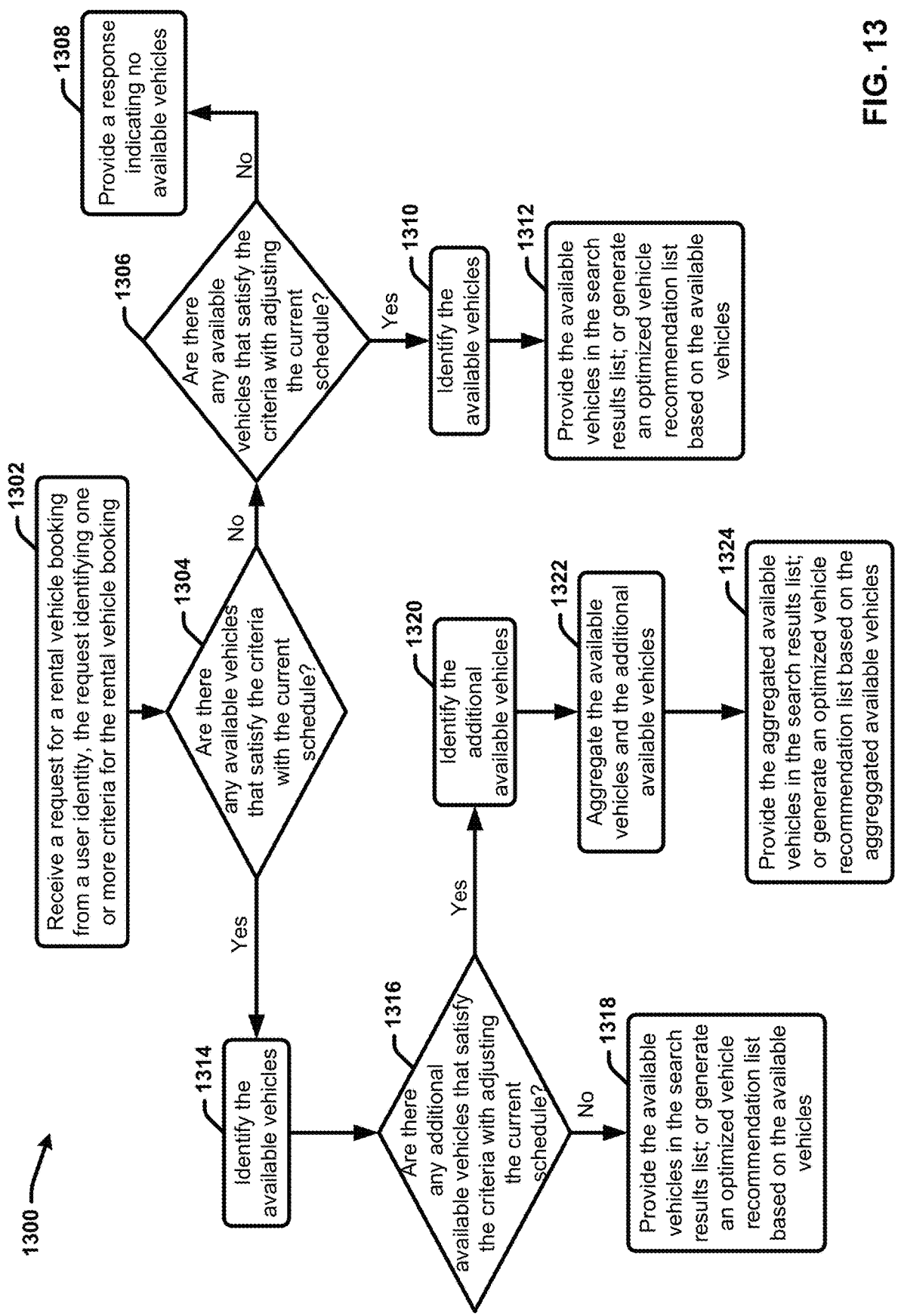
FIG. 13 provides a flow-diagram of an example process for responding to rental vehicle booking requests in association with utilization of dynamic vehicle scheduling in accordance with one or more embodiments of the disclosed subject matter.

FIG. 13 provides a flow-diagram of an example process 1300 for responding to rental vehicle booking requests in association with utilization of dynamic vehicle scheduling in accordance with one or more embodiments of the disclosed subject matter. Repetitive description of like elements employed in respective embodiments is omitted for sake of brevity.

With reference to FIGS. 9 and 13, in accordance with process 1300, at 1302 the search component 202 can receive a request for a rental vehicle booking from a user identity, the request identifying one or more criteria for the rental vehicle booking (e.g., a location, a time, etc.). At 1304, the scheduling component 228 can determine whether there are any available vehicles that satisfy the criteria with the current schedule. If not, then at 1306, the scheduling component 228 can determine whether there are any available vehicles that satisfy the criteria with adjusting the current schedule. For example, the scheduling 228 can employ one or more optimization models to determine whether alternate assignments of available vehicles to existing bookings and the requested booking are available that satisfy the required criteria of all bookings. The one or more optimization models can also be configured to generate the alternate assignments in a manner that maximizes fleet utilization, minimizes costs to the rental vehicle provider, maximizes profits to the rental vehicle provider, minimizes vehicle downtime (e.g., by generating tighter bookings), optimizes vehicle assignments based on current vehicle statuses and current operating conditions, optimizes vehicle assignments based on current fuel/battery levels, and the like. If no vehicles can be made available by adjusting the schedule, then at 1308, the results component 210 can provide a response indicating that no vehicles are available.

However, if vehicles can be made available by adjusting the schedule, at 1310, the scheduling component 228 can identify these available vehicles and provide them to the search component 202. At 1312, the system can then provide the available vehicles in the search results list (e.g., via results component 210); or generate an optimized vehicle recommendation list based on the available vehicles (e.g., using the ranking component 206, the recommendation component 208, the request interpretation component 602 and/or the grouping component 604). For example, the system can generate a ranked list of the available vehicles using the techniques discussed with reference to FIGS. 2-5 and/or generate a consolidated list of booking options containing the available vehicles using the techniques discussed with reference to FIGS. 6-8.

If at 1304, the scheduling component 228 determines there are available vehicles that satisfy the criteria with the current schedule, then at 1314, the scheduling component 228 can identify the available vehicles. At 1316, the scheduling component 228 can further determine whether there are any additional available vehicles that satisfy the criteria with adjusting the schedule (e.g., using one or more optimization models).

If at 1304 the scheduling component determines there are additional vehicles available, then at 1318, the scheduling component 228 can identify the additional available vehicles, and at 1322 the scheduling component 228 can aggregate all the available vehicles (e.g., the initially found available vehicles and the additional available vehicles). Then at 1322 the system can provide the aggregated available vehicles in the search results list (e.g., via results component 210); or generate an optimized vehicle recommendation list based on the aggregated available vehicles (using the ranking component 206, the recommendation component 208, the request interpretation component 602 and/or the grouping component 604). For example, the system can generate a ranked list of the aggregated available vehicles using the techniques discussed with reference to FIGS. 2-5 and/or generate a consolidated list of booking options containing the aggregated available vehicles using the techniques discussed with reference to FIGS. 6-8.

However, if at 1304 the scheduling component determines there are no additional vehicles available, then at 1318, the system can then provide the (initially identified) available vehicles in the search results list (e.g., via results component 210); or generate an optimized vehicle recommendation list based on the available vehicles (e.g., using the ranking component 206, the recommendation component 208, the request interpretation component 602 and/or the grouping component 604). For example, the system can generate a ranked list of the available vehicles using the techniques discussed with reference to FIGS. 2-5 and/or generate a consolidated list of booking options containing the available vehicles using the techniques discussed with reference to FIGS. 6-8.

In accordance with process 1300 wherein the results component 210 provides the user identity with a list of available vehicle booking options (e.g., as search results rendered at their renter device in via a web-application user interface or the like), if the user proceeds with selection of one of the booking options, the booking component 232 can accept the booking and add it to the existing bookings 234. The scheduling component 228 can further adjust the dynamic schedule 230 to include the new booking based on the vehicle option selected.

Figure 14:
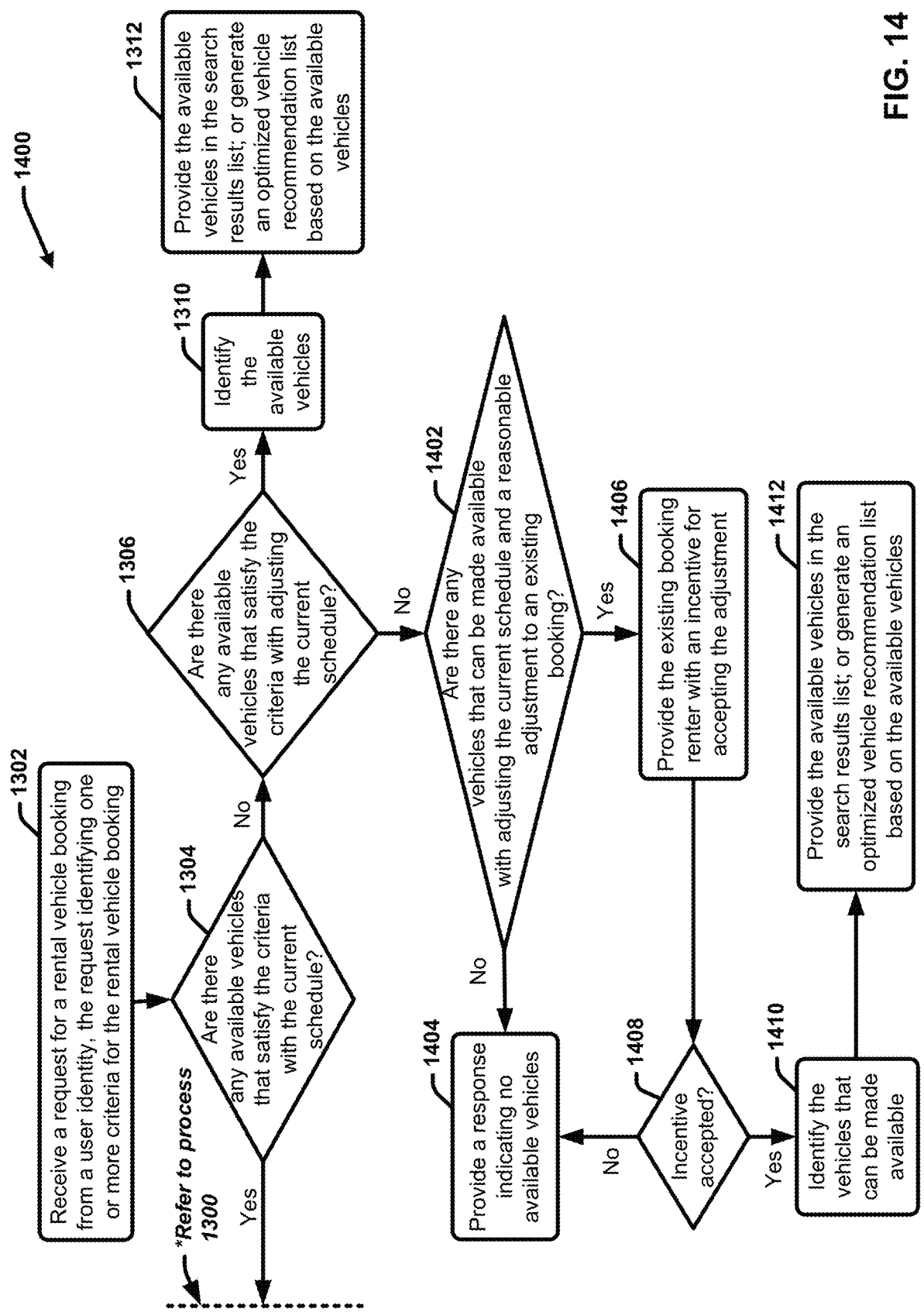
FIG. 14 provides a flow-diagram of another example process for responding to rental vehicle booking requests in association with utilization of dynamic vehicle scheduling in accordance with one or more embodiments of the disclosed subject matter.

FIG. 14 provides a flow-diagram of another example process 1400 for responding to rental vehicle booking requests in association with utilization of dynamic vehicle scheduling in accordance with one or more embodiments of the disclosed subject matter. Process 1400 is similar to process 1300 with the addition of existing booking change incentives to facilitate opening available booking options. Repetitive description of like elements employed in respective embodiments is omitted for sake of brevity.

With reference to FIGS. 9 and 14, process 1400 can proceed initially in a same or similar manner as process 1300, wherein at 1302 the search component 202 can receive a request for a rental vehicle booking from a user identity, the request identifying one or more criteria for the rental vehicle booking (e.g., a location, a time, etc.). At 1304, the scheduling component 228 can determine whether there are any available vehicles that satisfy the criteria with the current schedule. If yes, then process 1400 can proceed as described with reference to process 1300 and continue to block 1314 and so on.

If at 1304, no vehicles are found available with the current schedule, then at 1306, the scheduling component 202 can determine whether there are any vehicles that satisfy the criteria that can be made available by adjusting the schedule (e.g., using one or more optimization models). If so, at 1310, the scheduling component 228 can identify these available vehicles and provide them to the search component 202. At 1312, the system can then provide the available vehicles in the search results list (e.g., via results component 210); or generate an optimized vehicle recommendation list based on the available vehicles (e.g., using the ranking component 206, the recommendation component 208, the request interpretation component 602 and/or the grouping component 604). For example, the system can generate a ranked list of the available vehicles using the techniques discussed with reference to FIGS. 2-5 and/or generate a consolidated list of booking options containing the available vehicles using the techniques discussed with reference to FIGS. 6-8.

However, if at 1304, the scheduling component 228 determines no vehicles can be made available by adjusting the current schedule, then at 1402, the scheduling component 228 can determine whether there any available vehicles with adjusting the current schedule and a reasonable adjustment to an existing booking (e.g., using one or more of the techniques discussed above for determining the reasonable adjustment). As discussed above, the criteria/boundaries of what the scheduling component 228 can consider a reasonable adjustment can be predefined. If at 1402, no available vehicles can be found, then at 1404, the results component 210 can provide a response indicating no vehicles are available that satisfy the user's booking criteria.

However, if at 1402 one or more vehicles can be made available with a reasonable adjustment to an existing booking, then at 1406, the incentive component 904 can provide the existing booking renter with an incentive for accepting the adjustment. For example, the incentive component 904 can provide the renter with a special offer (e.g., as a text message, a push notification, an email, or the like) asking the renter if they would accept an adjustment to their existing booking (e.g., a change to the booking timeslot, a change to the booking location, a change to the booking vehicle type, etc.) in return for a monetary credit, a coupon/discount for a future rental booking, or the like. At 1408, if the incentive offer is not accepted, then at 1404, the results component 210 can provide a response to the user that no vehicles are available that satisfy their booking criteria.

If at 1408, the incentive is accepted, then at 1410, the scheduling component 228 can identify the vehicles that can be made available and provide these vehicles to the search component 202. Then at 1412, the system can then provide these available vehicles as options in the search results list (e.g., via results component 210); or generate an optimized vehicle recommendation list based on these available vehicles (e.g., using the ranking component 206, the recommendation component 208, the request interpretation component 602 and/or the grouping component 604).

In accordance with process 1400 wherein the results component 210 provides the user identity with a list of available vehicle booking options (e.g., as search results rendered at their renter device in via a web-application user interface or the like), if the user proceeds with selection of one of the booking options, the booking component 232 can accept the booking and add it to the existing bookings 234. The scheduling component 228 can further adjust the dynamic schedule 230 to include the new booking based on the vehicle option selected. In an implementation in which the selected vehicle option is for a vehicle that was made available based on acceptance of the adjustment to the existing booking, the booking component 232 can further update the existing booking in the existing bookings data and provide the renter of the existing booking with an updated rental agreement. In some implementations in which the user providing the search request chooses not to book a vehicle option that was made available based on acceptance of the adjustment to the existing booking, the incentive component 904 can inform the renter of the existing booking that their original rental agreement stands and retract the incentive offer. In this regard, the incentive offer provided to the existing renter can be tentative on whether or not the user providing the search request chooses not to book the vehicle option that was made available based on acceptance of the adjustment to the existing booking.

Figure 15:
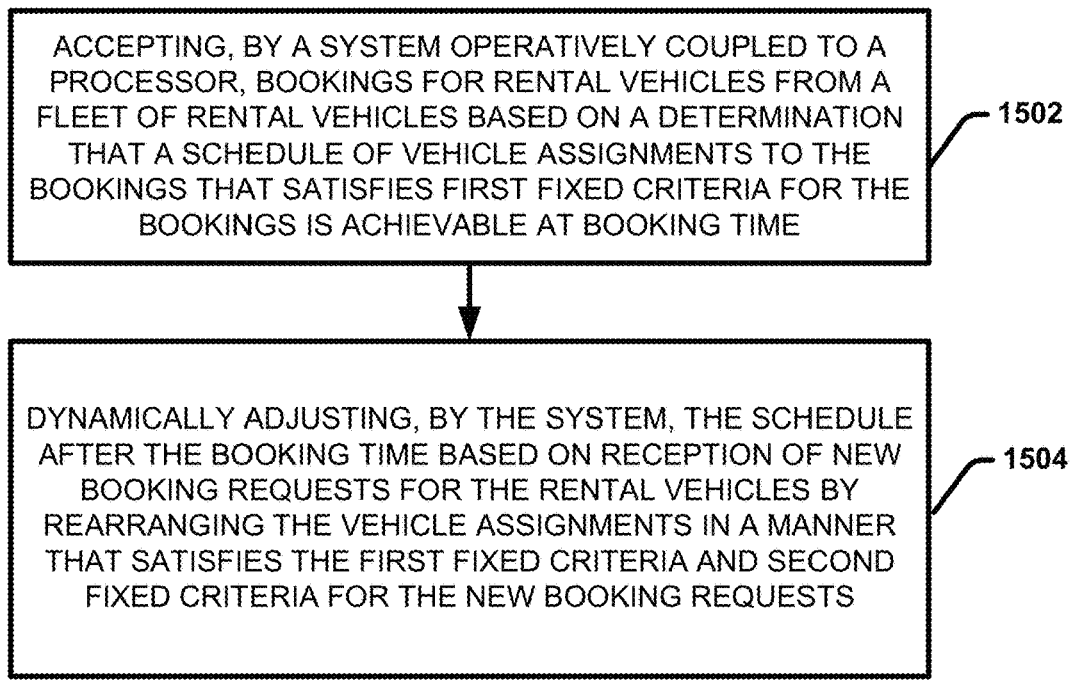
FIG. 15 illustrates a block diagram of an example, non-limiting computer-implemented method for dynamic vehicle scheduling in accordance with one or more embodiments of the disclosed subject matter.

FIG. 15 illustrates a block diagram of an example, non-limiting computer-implemented method for dynamic vehicle scheduling in accordance with one or more embodiments of the disclosed subject matter. Repetitive description of like elements employed in respective embodiments is omitted for sake of brevity.

In accordance with method 1500, at 1502, a system operatively coupled to a processor (e.g., system 100), can accept booking for rental vehicles from a fleet of rental vehicles based on a determination that a schedule (e.g., dynamic schedule 230) of vehicle assignments to the bookings that satisfies first fixed criteria for the bookings is achievable at booking time (e.g., using booking component 232). At 1504, the system can further dynamically adjust (e.g., using scheduling component 228) the schedule (e.g., the dynamic schedule 230) after the booking time based on reception of new booking requests for the rental vehicles by rearranging the vehicle assignments in a manner that satisfies the first fixed criteria and second fixed criteria for the new booking requests.

Figure 16:
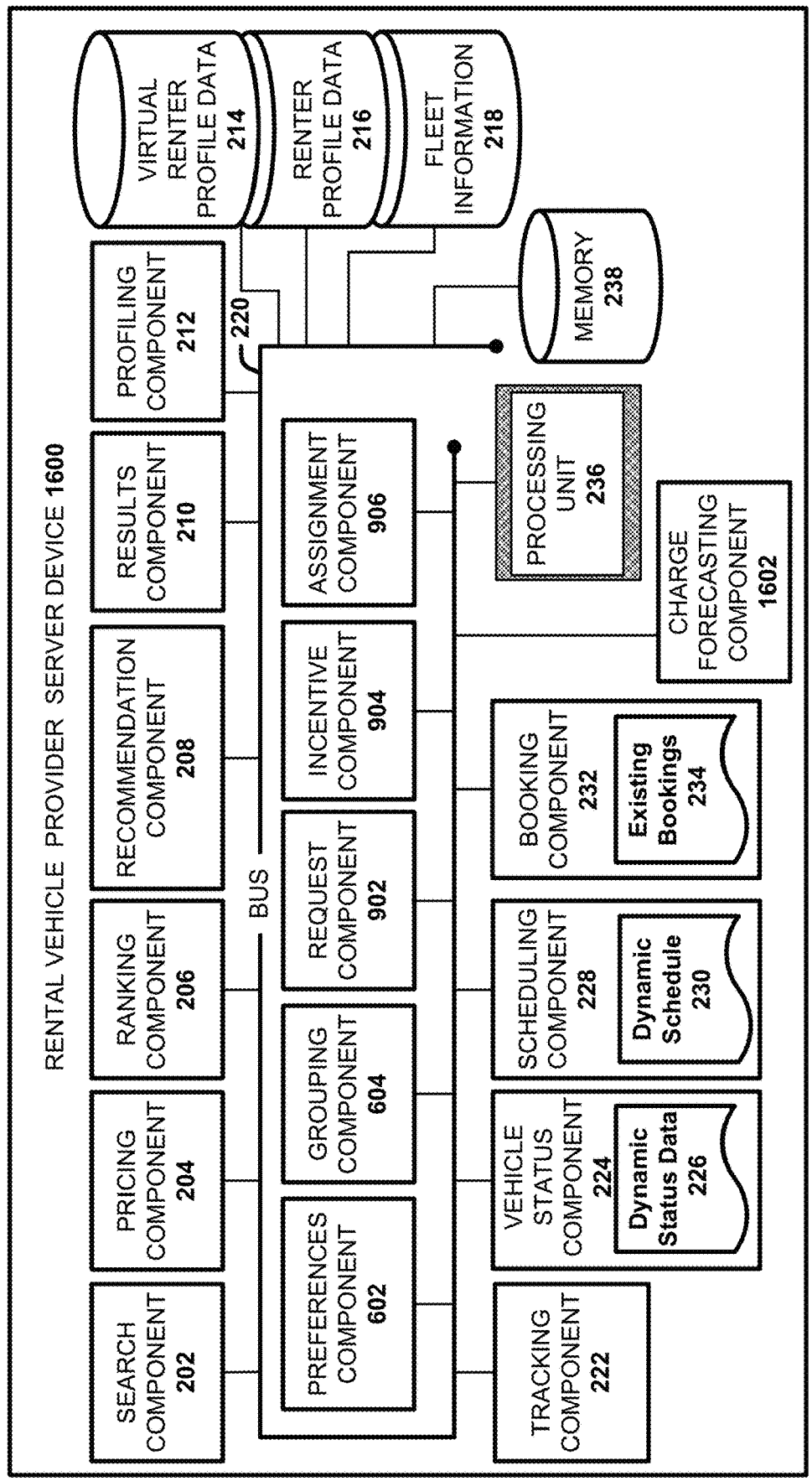
FIG. 16 illustrates a block diagram of an example, non-limiting rental vehicle provider server device that facilitates optimizing fleet utilization of BEVs based on predicted charge levels in accordance with one or more embodiments of the disclosed subject matter.

FIG. 16 illustrates a block diagram of an example, non-limiting rental vehicle provider server device 1600 that facilitates optimizing fleet utilization of BEVs based on predicted charge levels in accordance with one or more embodiments of the disclosed subject matter. In various embodiments, rental vehicle provider device 1600 can correspond to rental vehicle server device 108, or vice versa. Rental vehicle provider server device 1600 can include same or similar components as rental vehicle provider server device 900 with the addition of charge forecasting component 1602. Repetitive description of like elements employed in respective embodiments is omitted for sake of brevity.

With reference to FIGS. 1 and 16, in some embodiments, the rental vehicle system 100 can provide a BEV sharing service wherein, all (or at least some) of the vehicles 112 included in the fleet can be BEVs. With these embodiments, the stations 114 can include or correspond to charging stations where the BEVs can be charged. For example, the charging stations can include several parking spots that are coupled to one or more charging units via which the BEVs are charged. In some implementations of these embodiments, the BEVs can be rented hourly (or even by the minute) as well as for longer durations of time (e.g., daily, weekly, monthly, etc.). The BEV sharing service can also allow users (e.g., renters) to pick-up the BEVs at any of the charging stations and return the vehicles to any charging station with an available charging spot.

In accordance with these embodiments, the rental vehicle system 100 can provide for booking the BEVs online based on availability using a web-based platform (e.g., a web-application, a client application, or the like) in a same or similar manner as discussed above. In addition to availability, the rental vehicle system 100 can further optimize bookings based on battery levels of the BEVs in a manner that aligns the battery levels with customer needs. For example, the rental vehicle system 100 can provide user with booking options and assign BEVs to bookings in a manner that ensures the renter will receive a BEV that has a sufficient charge level to last the duration of the booking while maximizing fleet utilization.

To facilitate this end, the tracking component 222 can track information regarding current battery levels of all the BEVs in real-time (or substantially real-time). This information can be included in the dynamic status data 226 and used by the assignment component 906 when assigning available vehicles to bookings at or near the time of pick-up (e.g., within a defined short window of time before pick-up). In addition, the charge forecasting component 1602 can forecast expected charge levels of the BEVs at future points in time and include this information in the dynamic status data 226. For example, the charge forecasting component 1602 can forecast an expected charge level of the BEV at the completion of current rental vehicle booking, at the start of a future rental vehicle booking, and at the completion of the future rental vehicle booking. The booking component 232 can further use this information when accepting future bookings for the BEVs based on whether the expected charge level of an available vehicle at the time of pick-up will be sufficient based on the context of the future booking (e.g., whether the expected charge level will be enough for the duration of the future booking, whether the expected charge level will be enough to ensure the future booking can make it to their destination without requiring a charge stop, and so on). In this way, the operating company can determine whether it can allow a customer to book a car at a certain point in the future, while maximizing the fleet utilization, but without risking a customer getting a car with an unacceptably low charge level.

In one or more embodiments, the charge forecasting component 1602 can predict future charge levels of the BEVs based on the current battery levels of the BEVs, the existing rental agreements for the BEVs as included in the existing bookings 234 data (e.g., including currently active bookings wherein the BEV is currently rented out and in-use and future bookings that have not yet been initiated), and the assigned schedule of the BEVs for the existing bookings (e.g., as included in the dynamic schedule 230). For example, the information regarding the exiting rental agreements can include information regarding their scheduled pick-up times, durations of the bookings, their scheduled drop-off times, their scheduled pick-up locations (if applicable), their scheduled drop-off locations (if applicable), and routes of the bookings (e.g., including distance of the routes, locations of the routes, route destinations, the locations of the charging stations along the route, and so on). The charge forecasting component 1602 can also forecast the expected charge levels of the BEVs based on known battery consumption rates of the respective vehicles (e.g., based on the make/model of the respective BEVs as provided in the fleet information 218).

The charge forecasting component 1602 can also forecast the expected charge levels of the BEVs based on scheduled or expected durations of charging periods following completion of the existing rental agreements. The charge forecasting component 1602 can also determine the forecasted charge levels of the BEVs based on type of charging stations used for the charging periods and the charging rates of the respective charging stations, which can vary based on the type of the charging station (e.g., as defined in the fleet information 218). The charge forecasting component 1602 can also determine the forecasted charge levels of the BEVs based on and the known or expected number and type of the BEVs sharing same charging stations used for the charging periods.

In some implementations, the charge forecasting component 1602 can also forecast the expected charge levels of the BEVs based known or forecasted whether conditions associated with the existing rental agreements. For example, the charge forecasting component 1602 can forecast the expected charge levels of the BEVs based on known or expected temperatures at the time and duration of the existing rental agreements and the manner in which the temperature affects their battery consumption rates. The charge forecasting component 1602 can forecast the expected charge levels of the BEVs based on known or expected traffic associated with utilization of the BEVs for the existing rental agreements, which can also affect their battery consumption rates. The charge forecasting component 1602 can forecast the expected charge levels of the BEVs based on whether the BEV will require re-charging by the renter at some point during their rental period (e.g., based on the duration of the rental period, the distance of the route used to be used for the BEV, the battery consumption rate of the BEV, the locations of the charging stations along the route, and so on), the timing of the re-charging, and the expected amount of the re-charging.

In this regard, the tracking component 222 can monitor utilization of the BEVs and the charge forecasting component 1602 can regularly forecast the expected charge level of a BEVs based on their utilization and their scheduled utilization in the future. For example, the charge forecasting component 1602 can predict a BEVs future charge level, given that BEVs known schedule and telematics data. In various implementations, for future bookings, the charge forecasting component 1602 can subtract from the BEV's predicted charge state, depending on the length of the booking (and other things known about the planned journey, such as the route, the outside temperature, traffic, number of stops, whether the car will be re-charged by the renter during the rental period, the locations of the charging stations along the route, etc.). For future time in between bookings, the charge forecasting component 1602 can add a charge state given a formula that is dependent on the car's initial charge state, the time being charged, the car model, the parking's charger model and the number of cars potentially sharing the same charger circuit.

The booking component 232 can further control renting of the BEVs based on their forecasted charge levels. For example, in various embodiments, the booking component 232 can prevent booking a future rental agreement for a BEV based on a determination (e.g., by the charge forecasting component 1602) that a forecasted charge level of the BEV at a time of initiation of the future rental agreement is less than a minimum charge level required for the future rental agreement. The assignment component 906 and/or the scheduling component 228 can also assign BEVs to existing bookings based on their expected charge level at the time of initiation of the rental agreement being greater than or equal to a minimum charge level and/or being greater than or equal to a charge level needed to last the duration of the rental agreement.

The assignment component 906 and/or the scheduling component 228 can also assign BEVs to existing bookings based in a manner that minimizes the number and duration of charging periods for all the BEVs between bookings. For example, the assignment component 906 and/or the scheduling component 228 can predict how much electricity will be needed for an upcoming booking based on the duration of the booking and various other factors known or expected about the booking (e.g., route, whether, traffic, number of stops, the locations of the charging stations along the route, etc.). For instance, for a booking that is 2 hours, the assignment component 906 and/or the scheduling component can determine that a 30% full battery or more will be sufficient. With this example, in order to optimize fleet utilization, the assignment component 906 and/or scheduling component 228 can assign the booking an available vehicle that has just the right amount of juice (e.g., at 30% or closest to 30% without being under 30%). This minimizes charging periods which take the car off the road. For example, it is preferable to charge less frequently from zero to full, or to charge when convenient (e.g., when located near an empty charging station).

The scheduling component 228 can also identify available vehicles for recommending to potential renters (e.g., by the recommendation component 208 and/or the results component 210)) in response to received booking requests based on expected battery needs of the booking requests and the expected charge levels of the BEVs at the time of initiation of the bookings. For example, in response to reception of a new booking request for a BEV in the future, the scheduling component 228 can determine an expected minimum battery/charge amount needed for the booking based on the duration of the booking and the context of the booking (e.g., the forecasted weather, the forecasted traffic, the route, the locations of the charging stations along the route, etc.). The scheduling component 228 can further identify, (e.g., using the forecasted charge information for the BEVs provided in the dynamic status data 226), one or more BEVs that have a forecasted charge level at a time of initiation of booking that satisfies a minimum charge level required for the booking. The recommendation component 208 can further recommend or otherwise provide these available BEVs to the potential renter as booking options in the search results. In some embodiments, the ranking component 206 can further rank or order the BEVs in the search results in an order that optimizes fleet utilization by ranking the BEVs with the least amount of expected battery higher. For example, assume the minimum charge level needed is 30% and the scheduling component 228 identifies available vehicles with expected charge levels of 35%, 50%, 60%, 80%, and 100%. To encourage the user to choose the vehicle with the lowest amount of battery to serve the user's needs and thus minimize the number of charging periods for the other vehicles, the ranking component 206 can list the vehicle with the least amount of battery first (e.g., list the vehicle with 35% battery first, followed by the vehicle with 50% battery, and so on). The search results can also omit information regarding the expected current battery levels of the rental vehicle options because all of the options satisfy the energy needs of the renter.

Figure 17:
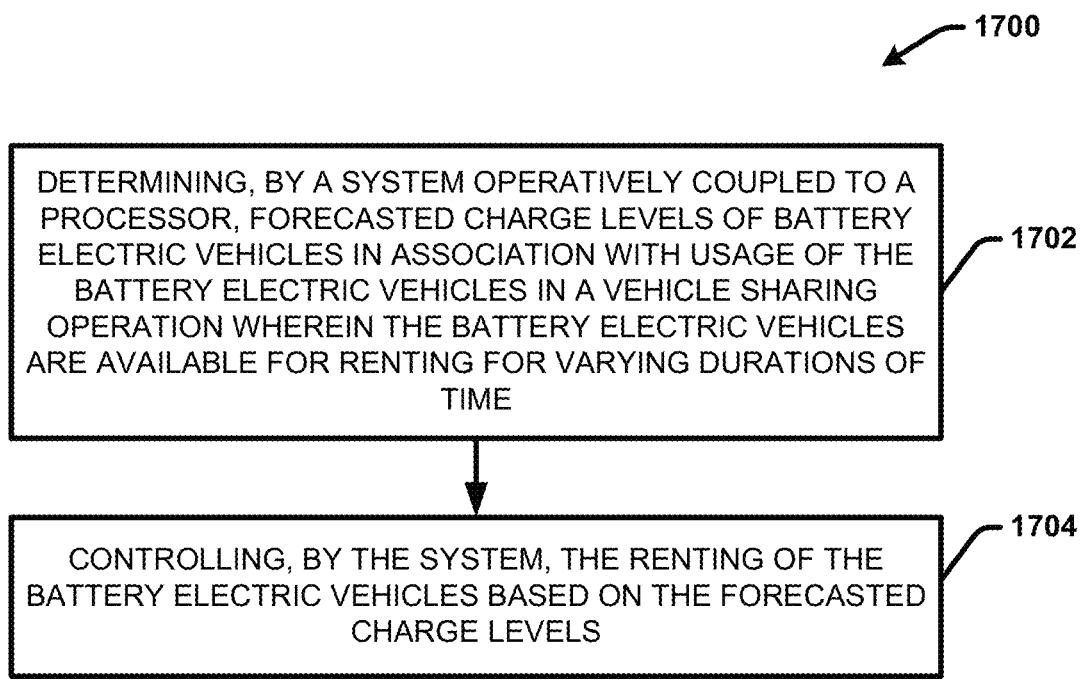
FIG. 17 illustrates a block diagram of an example, non-limiting computer-implemented method for optimizing fleet utilization of BEVs based on predicted charge levels in accordance with one or more embodiments of the disclosed subject matter.

FIG. 17 illustrates a block diagram of an example, non-limiting computer-implemented method 1700 for optimizing fleet utilization of BEVs based on predicted charge levels in accordance with one or more embodiments of the disclosed subject matter. Repetitive description of like elements employed in respective embodiments is omitted for sake of brevity.

In accordance with method 1700, at 1702, a system operatively coupled to a processor (e.g., system 100), can determine (e.g., using charge forecasting component 1602) forecasted charge levels of BEVs in association with usage of the BEVs in a vehicle sharing operation wherein the BEV are available for renting for varying durations of time. At 1704, the system can further control the renting of the BEV based on the forecasted charge levels (e.g., via booking component 232).

Figure 18:
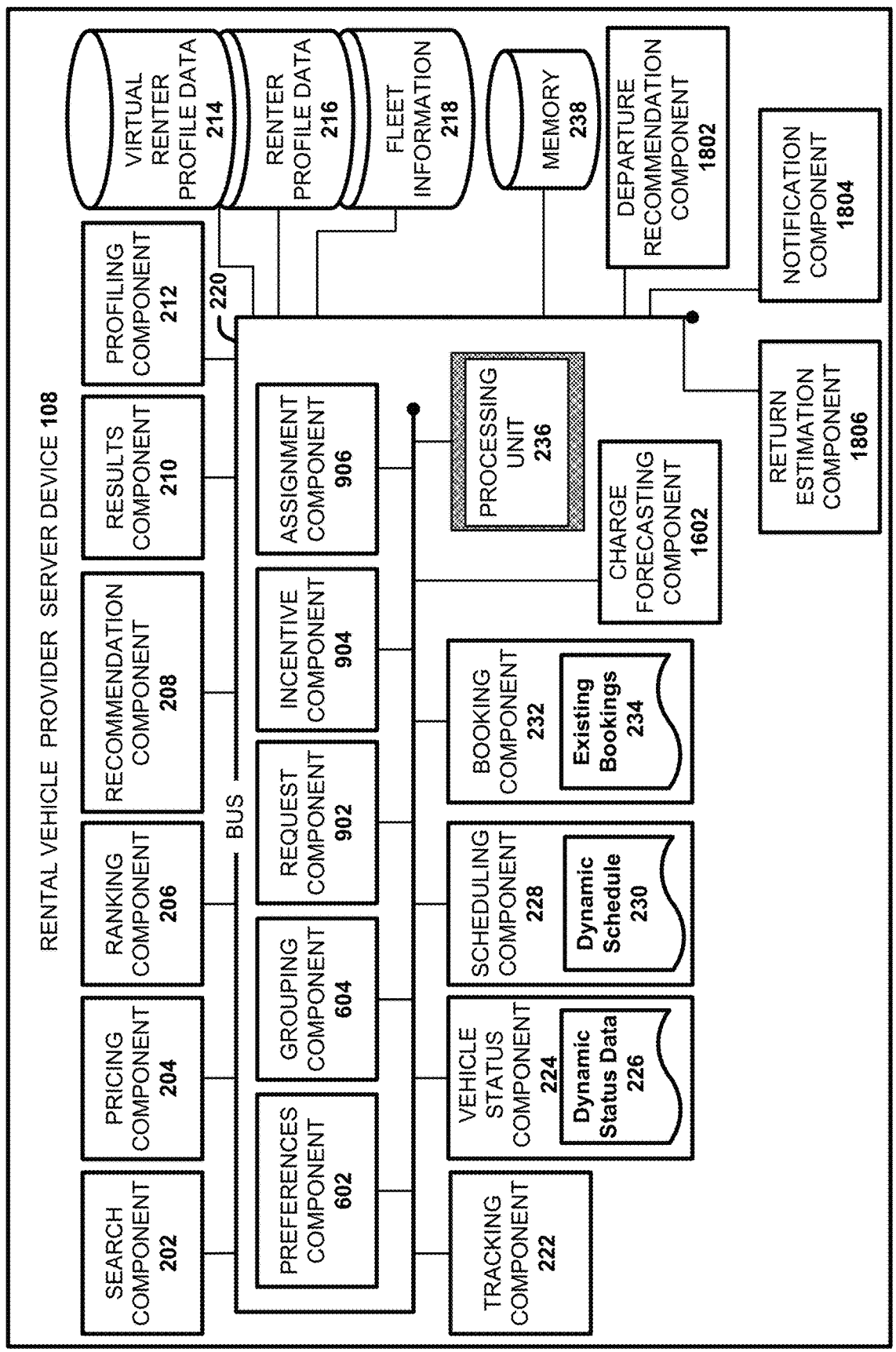
FIG. 18 illustrates a block diagram of an example, non-limiting rental vehicle provider server device that facilitates predicting late rental vehicle returns and mitigating potential downstream effects in accordance with one or more embodiments of the disclosed subject matter.

FIG. 18 illustrates a block diagram of an example, non-limiting rental vehicle provider server device 1800 that facilitates predicting late rental vehicle returns and mitigating potential downstream effects in accordance with one or more embodiments of the disclosed subject matter. In various embodiments, rental vehicle provider device 1800 can correspond to rental vehicle server device 108, or vice versa. Rental vehicle provider server device 1800 can include same or similar components as rental vehicle provider server device 1600 with the addition of departure recommendation component 1802, notification component 1804, and return estimation component 1806. Repetitive description of like elements employed in respective embodiments is omitted for sake of brevity.

Customers returning their car back too late is a big problem for car sharing providers who strive for tight booking schedules in order to maximize fleet utilization. The departure recommendation component 1802 facilities mitigating this problem by determining a recommended departure time at which a rental vehicle should initiate a route to a rental vehicle return location in order to arrive at the rental vehicle location by their scheduled return time. In various embodiments, the departure recommendation component 1802 can determine the recommended departure time based on a current time, a scheduled return time for the rental vehicle, a current location of the rental vehicle and traffic data associated with the route.

For example, in some embodiments, the departure recommendation component 1802 can monitor the location of the rental vehicle relative to the scheduled return location based on tracked vehicle location information received by the tracking component 222 as the scheduled return time approaches. The departure recommendation component 1802 can further regularly and/or continuously determine and track how long (e.g., the return travel time) it will take for the rental vehicle to make it the scheduled return location in real-time based on the current location of the rental vehicle relative to the return location and the fastest route to the return location from the vehicle's current location based on available routes and traffic data (e.g., as received from one or more external systems/sources 102). In some embodiments, the departure recommendation component 1802 can also factor in time needed for refueling or recharging based on the current fuel/charge level of the vehicle and whether the renter has agreed to assume responsibility of refueling/recharging in the rental agreement. The departure recommendation component 1802 can also factor current and forecasted queue return times at the rental vehicle return facility. In this regard, the departure recommendation component 1802 can regularly or continuously calculate the return travel time as the location of the vehicle changes and the traffic conditions change.

The departure recommendation component 1802 can further monitor the return travel time relative to the scheduled return time to determine when the renter vehicle should depart its current location to make it to the return location in time. For example, departure recommendation component 1802 can determine when the return travel time is approaching (e.g., within a defined time window) the current amount of time needed to arrive at the scheduled return location at the scheduled return time. For instance, the departure recommendation component 1802 can determine when the return travel time is N minutes greater (e.g., 5 minutes, 10 minutes, 20 minutes, etc.) than the current amount of time needed to arrive at the scheduled return location at the scheduled return time. In some implementations, the departure recommendation component 1802 can begin calculating the return travel time within a defined time window relative to the scheduled return time (e.g., 30 minutes before, 1 hour before, 2 hours before, 6 hours before, etc.). For example, if the rental vehicle booking is longer than a 24-hour period, the departure recommendation component 1802 can forgo calculating the return travel time until the return time window becomes relevant.

The notification component 1804 can further send a departure notification to a current renter of the rental vehicle prior to the recommended departure time indicating the recommended departure time based on the return travel time being at or near the current amount of time needed to arrive at the scheduled return location at the scheduled return time. For example, the notification component 1804 can be configured to notify the current renter N minutes before they should leave their current location to return back to the rental vehicle station in order to make it there by their scheduled return time. For example, the notification component 1804 can send a departure recommendation notification to device associated with the renter (e.g., their smartphone, their smartwatch, a notification system inside the rental vehicle itself, etc.) at or near the recommended departure time prompting the renter to head to the return facility.

The point in time prior to the recommended departure time at which the notification component 1804 sends the departure notification can vary. In some embodiments, point in time can be fixed (e.g., at 5 minutes, at 10 minutes at 15 minutes and so one). In other embodiments, the notification component 1804 can be configured to send multiple notifications at different times prior to the recommended departure time as the recommended departure time approaches (e.g., a 30 minute prior notification, a 15 minute prior notification, and a 5 minute prior notification). In other embodiments, the point in time can be defined in profile information of the user. For example, the user can set parameters defining when they would like to receive departure notifications. The profile information can also provide the option for opting out of receiving departure recommendation notifications. Additionally, or alternatively, the point in time can vary based on the context of the renter. For example, a renter traveling alone may only need a 10-minute notification as opposed to a family traveling with 3 children, who may need more notice to get everyone ready to go. In other implementations, the notification component 1804 can determine when to send a departure recommendation notification based on rental history of the renter. For example, if the renter is often late, the notification component 1804 can send departure recommendation notifications earlier and/or more frequently prior to the recommended time of departure.

In addition to notifying renters when to head to their scheduled return location in order to make it there by their scheduled return time, the return estimation component 1806 can estimate whether a currently rented vehicle will be returned late based a current time, a scheduled return time for the rental vehicle, a current location of the rental vehicle and traffic data associated with the route. The return estimation component 1806 can also estimate how late the currently rented vehicle will be based a current time, the scheduled return time for the rental vehicle, the current location of the rental vehicle and traffic data associated with the route. In this regard, the return estimation component can estimate an expected return time at which the rental vehicle will be returned to the rental vehicle return location based on the scheduled return time, the current location and the traffic data. In some implementations, the return estimation component 1806 can also employ one or more machine learning and artificial intelligence techniques to estimate the expected return time. For example, the one or more machine learning and artificial intelligence techniques can comprise learning correlations between late rental vehicle returns, renter profile factors and rental context factors.

In some embodiments, the notification component 1804 can further send a late arrival notification to a booking system associated with the rental vehicle based on a determination that the expected time is later than the scheduled time, the late arrival notification identifying the expected time as a late arrival time for the rental vehicle. With these embodiments, the booking system can include the vehicle status component 224, the scheduling component 228 and the booking component 232. The booking system can further change one or more existing rental vehicle bookings affected by the late arrival time to minimize one or more losses associated with late arrival of the rental vehicle. For example, the vehicle status component 224 can adjust the current and future availability of the rental vehicle based on whether and to what degree the rental vehicle is expected be returned late. The scheduling component 228 can also adjust the dynamic schedule 230 to account for the late return and/or the assignment component 906 can adjust the vehicle assignments for the existing bookings to account for the late return.

The return estimation component 1806 can also forecast, at the time of booking a rental vehicle and/or at one or more points in time between the time of booking and the time of actual return of the rental vehicle, whether the rental vehicle is expected to be returned to late (e.g., minutes, hours, days or even weeks before pick-up). The vehicle status component 224 can further update the dynamic status data 226, at the time of booking and/or at one or more times between the time of booking and the actual return of the vehicle, future availability of the rental vehicle based on whether and to what degree the rental vehicle is expected be returned late.

For example, the return estimation component 1806 can employ one or more machine learning and artificial intelligence techniques to forecast whether and to what degree the rental vehicle is expected be returned late based on the duration of the booking, the route of the booking, destination locations associated with the booking, the scheduled pick-up location, the scheduled return location (if applicable), forecasted fuel/battery levels of the vehicle, and forecasted traffic and weather conditions associated with the booking. The return estimation component 1806 can employ one or more machine learning and artificial intelligence techniques to forecast whether and to what degree the rental vehicle is expected be returned late based on the rental history of the renter (e.g., as included in their rental profile information) and the context of the booking. For example, when a booking is made and/or between the time of the booking and the actual return time, the return estimation component 1806 can examine the user profile information, the booking type, the history of the user being late in general and being late at certain locations, on certain dates (weekdays vs. weekend), and determine with a confidence interval whether and to what degree the renter will return the vehicle late (e.g., with 80 percent certainty, this trip will be 10 minutes late).

Figure 19:
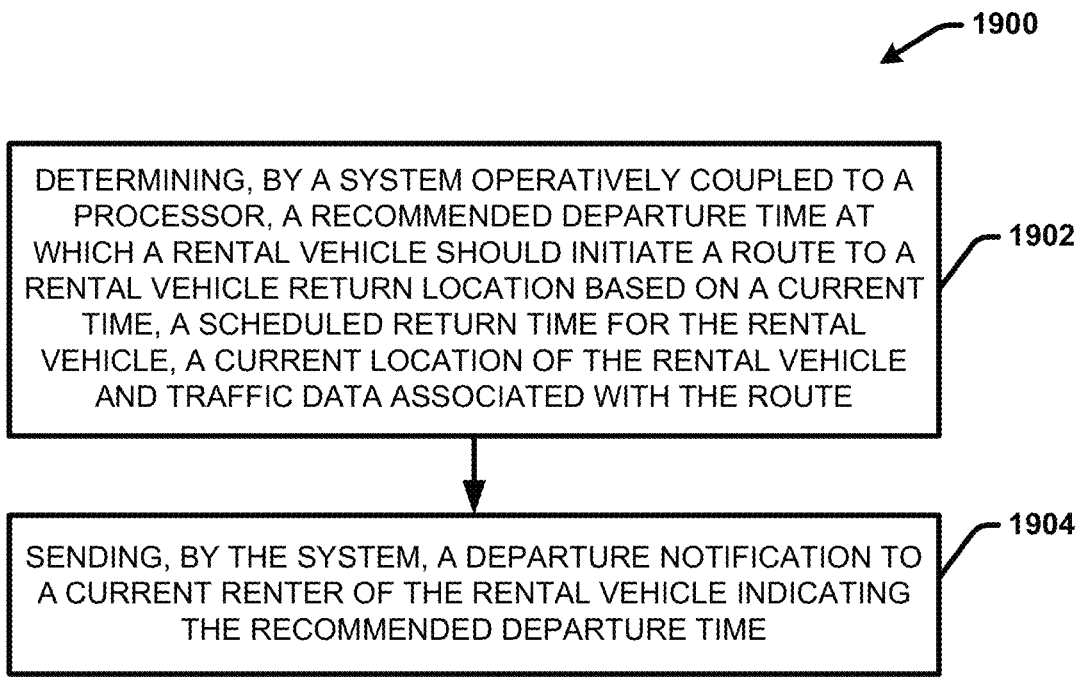
FIG. 19 illustrates a block diagram of an example, non-limiting computer-implemented method for mitigating potential downstream effects of a potential late return of a current rental vehicle booking in accordance with one or more embodiments of the disclosed subject matter.

FIG. 19 illustrates a block diagram of an example, non-limiting computer-implemented method 1900 for mitigating potential downstream effects of a potential late return of a current rental vehicle booking in accordance with one or more embodiments of the disclosed subject matter. Repetitive description of like elements employed in respective embodiments is omitted for sake of brevity.

In accordance with method 1900, at 1902, a system operatively coupled to a processor (e.g., system 100), can determine (e.g., using departure recommendation component 1802) a recommend departure time at which a rental vehicle should initiate a route to a rental vehicle return location based on a current time, a scheduled return time for the rental vehicle, a current location of the rental vehicle, and traffic data associated with the route. At 1904 the system can further send a departure notification to a current renter of the rental vehicle indicating the recommended departure time (e.g., using notification component 1804). For example, the departure notification can be sent to a personal computing device associated with the current renter (e.g., their smartphone, smartwatch, etc.), and/or to an in-vehicle notification system.

Figure 20:
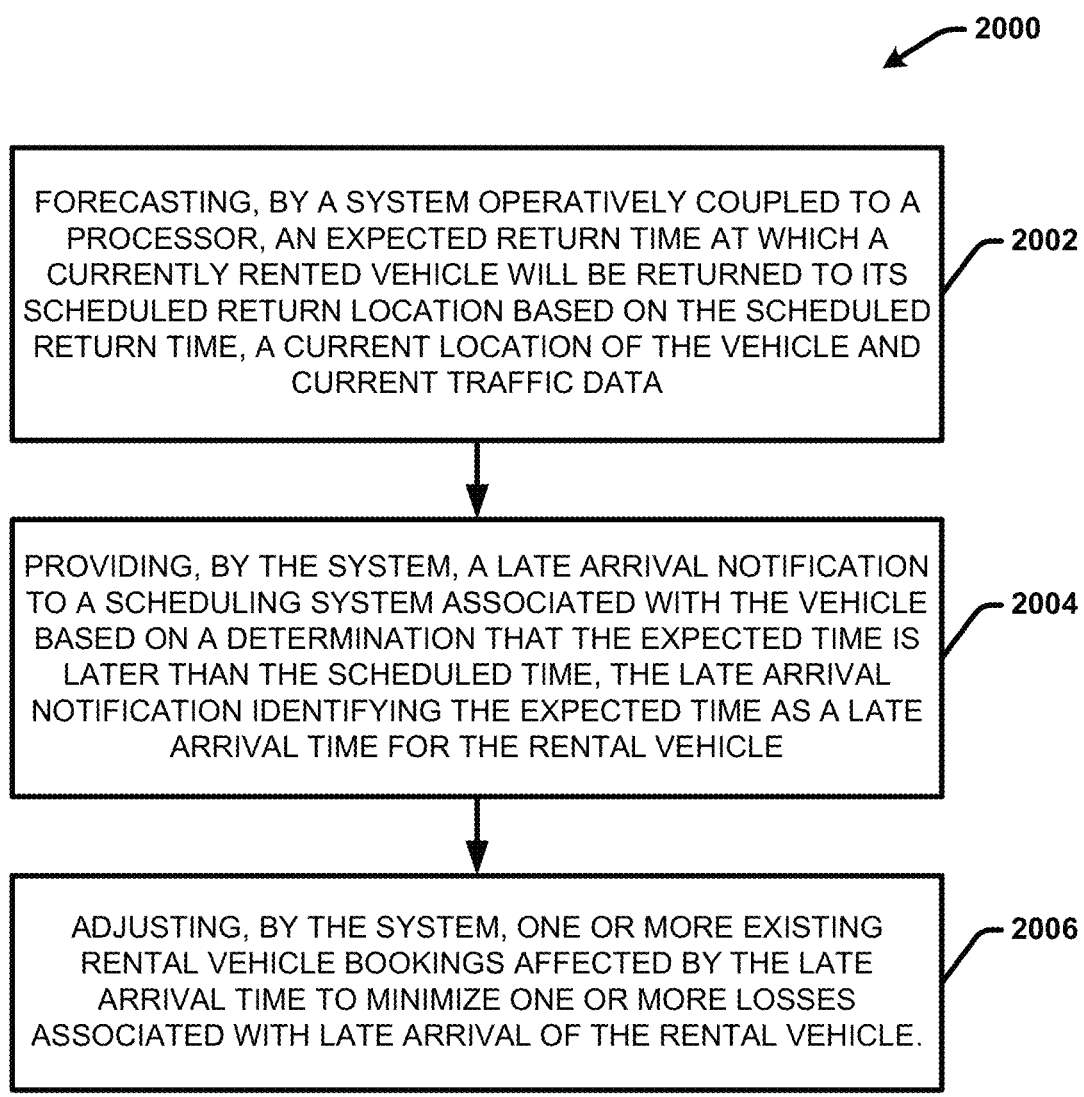
FIG. 20 illustrates a block diagram of another example, non-limiting computer-implemented method for mitigating potential downstream effects of a potential late return of a current rental vehicle booking in accordance with one or more embodiments of the disclosed subject matter.

FIG. 20 illustrates a block diagram of another example, non-limiting computer-implemented method 2000 for mitigating potential downstream effects of a potential late return of a current rental vehicle booking in accordance with one or more embodiments of the disclosed subject matter. Repetitive description of like elements employed in respective embodiments is omitted for sake of brevity.

In accordance with method 2000, at 2102, a system operatively coupled to a processor (e.g., system 100), can forecast at a time of booking a rental vehicle (e.g., using return estimation component 1806), an expected return time at which a currently rented vehicle will be returned to its scheduled return location based on the scheduled return time, a current location of the vehicle, and current traffic data. At 2004, the system can further provide a late arrival notification (e.g., via notification component 1804 to a scheduling system (e.g., scheduling component 228) based on a determination that the expected return time is later than the scheduled return time, the notification identifying the expected time as a late arrival time for the rental vehicle. At 2006, the system can further adjust one or more existing rental vehicle bookings affected by the late arrive time to minimize one or more losses associated with the late arrival of the rental vehicle (e.g., using scheduling component 228).

Figure 21:
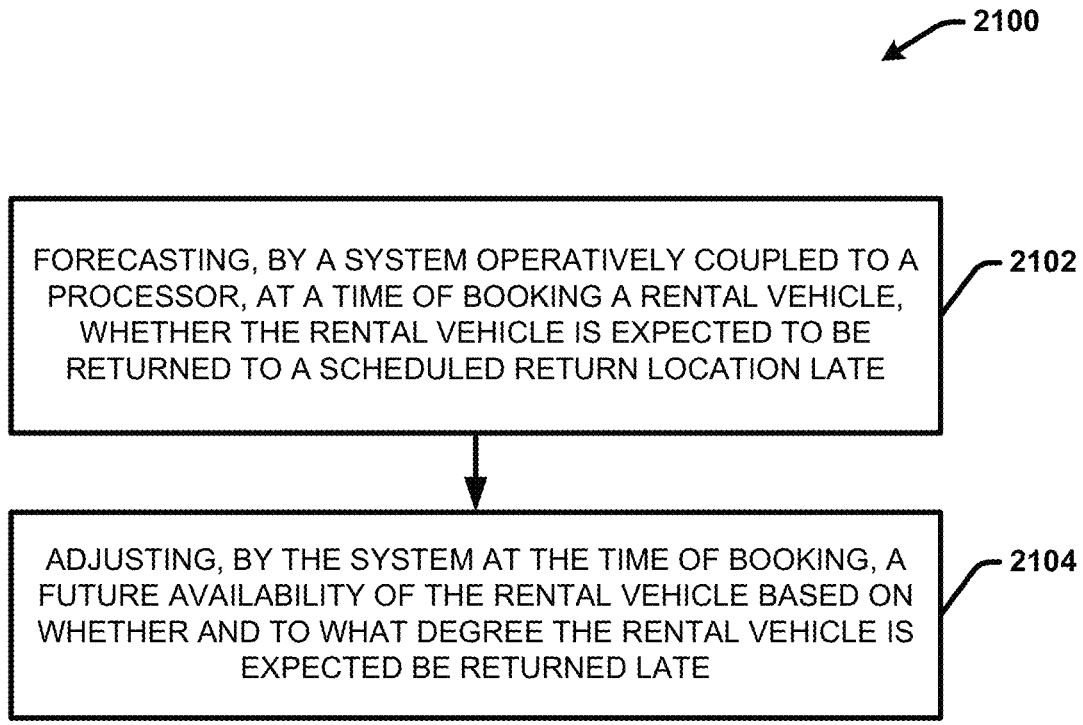
FIG. 21 illustrates a block diagram of an example, non-limiting computer-implemented method for predicting late rental vehicle returns at booking time and mitigating potential downstream effects in accordance with one or more embodiments of the disclosed subject matter.

FIG. 21 illustrates a block diagram of an example, non-limiting computer-implemented method 2100 for predicting late rental vehicle returns at booking time and mitigating potential downstream effects in accordance with one or more embodiments of the disclosed subject matter. Repetitive description of like elements employed in respective embodiments is omitted for sake of brevity.

In accordance with method 2100, at 2102, a system operatively coupled to a processor (e.g., system 100), can forecast at a time of booking a rental vehicle (e.g., using return estimation component 1806), whether the rental vehicle is expected to be returned late to a scheduled return location. At 2104, the system can further adjust, at the time of booking, a future availability of the rental vehicle based on whether and to what degree the rental vehicle is expected to be returned late (e.g., in the dynamic status data 226 using vehicle status component 224 and/or via the scheduling component 228).

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 22, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 22:
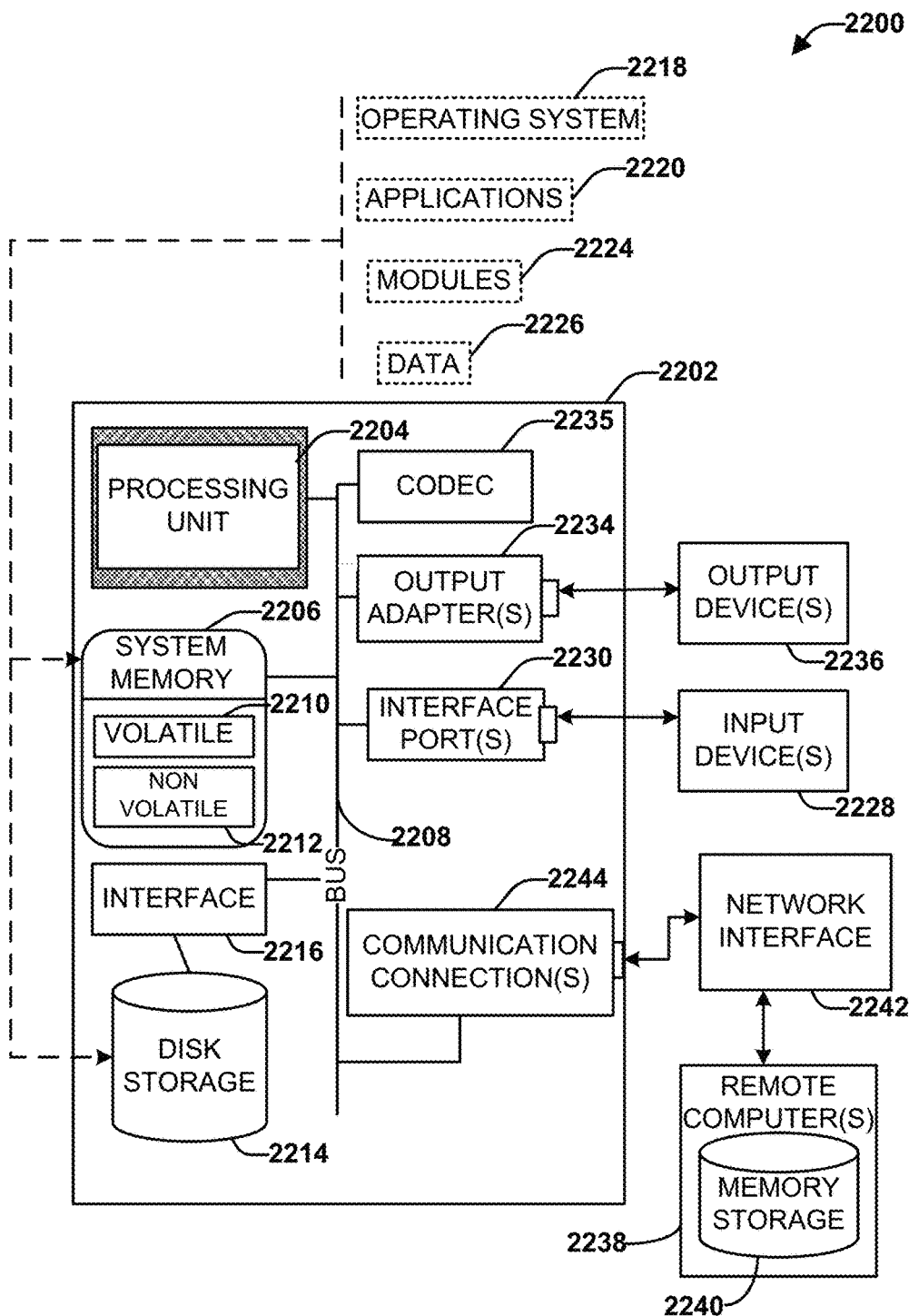
FIG. 22 illustrates a block diagram of an example, non-limiting operating environment in which one or more embodiments described herein can be facilitated.

With reference to FIG. 22, an example environment 2200 for implementing various aspects of the claimed subject matter includes a computer 2202. The computer 2202 includes a processing unit 2204, a system memory 2206, a codec 2235, and a system bus 2208. The system bus 2208 couples system components including, but not limited to, the system memory 2206 to the processing unit 2204. The processing unit 2204 can be any of various available processors. Dual microprocessors and other multiprocessor architectures also can be employed as the processing unit 2204.

The system bus 2208 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13224), and Small Computer Systems Interface (SCSI).

The system memory 2206 includes volatile memory 2210 and non-volatile memory 2212, which can employ one or more of the disclosed memory architectures, in various embodiments. The basic input/output system (BIOS), containing the basic routines to transfer information between elements within the computer 2202, such as during start-up, is stored in non-volatile memory 2212. In addition, according to present innovations, codec 2235 can include at least one of an encoder or decoder, wherein the at least one of an encoder or decoder can consist of hardware, software, or a combination of hardware and software. Although, codec 2235 is depicted as a separate component, codec 2235 can be contained within non-volatile memory 2212. By way of illustration, and not limitation, non-volatile memory 2212 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 2212 can employ one or more of the disclosed memory devices, in at least some embodiments. Moreover, non-volatile memory 2212 can be computer memory (e.g., physically integrated with computer 2202 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 2210 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 2202 can also include removable/non-removable, volatile/non-volatile computer storage medium. FIG. 22 illustrates, for example, disk storage 2214. Disk storage 2214 includes, but is not limited to, devices like a magnetic disk drive, solid state disk (SSD), flash memory card, or memory stick. In addition, disk storage 2214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2214 to the system bus 2208, a removable or non-removable interface is typically used, such as interface 2216. It is appreciated that disk storage 2214 can store information related to an entity. Such information might be stored at or provided to a server or to an application running on an entity device. In one embodiment, the entity can be notified (e.g., by way of output device(s) 2236) of the types of information that are stored to disk storage 2214 or transmitted to the server or application. The entity can be provided the opportunity to opt-in or opt-out of having such information collected or shared with the server or application (e.g., by way of input from input device(s) 2228).

It is to be appreciated that FIG. 22 describes software that acts as an intermediary between entities and the basic computer resources described in the suitable operating environment 2200. Such software includes an operating system 2218. Operating system 2218, which can be stored on disk storage 2214, acts to control and allocate resources of the computer system 2202. Applications 2220 take advantage of the management of resources by operating system 2218 through program modules 2224, and program data 2226, such as the boot/shutdown transaction table and the like, stored either in system memory 2206 or on disk storage 2214. It is to be appreciated that the claimed subject matter can be implemented with various operating systems or combinations of operating systems.

An entity enters commands or information into the computer 2202 through input device(s) 2228. Input devices 2228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2204 through the system bus 2208 via interface port(s) 2230. Interface port(s) 2230 include, for example, a serial port, a parallel port, a game port, and a universal serial bus (USB). Output device(s) 2236 use some of the same type of ports as input device(s) 2228. Thus, for example, a USB port can be used to provide input to computer 2202 and to output information from computer 2202 to an output device 2236. Output adapter 2234 is provided to illustrate that there are some output devices 2236 like monitors, speakers, and printers, among other output devices 2236, which require special adapters. The output adapters 2234 include, by way of illustration and not limitation, video and sound cards that provide a means of connection between the output device 2236 and the system bus 2208. It should be noted that other devices or systems of devices provide both input and output capabilities such as remote computer(s) 2238.

Computer 2202 can operate in a networked environment using logical connections to one or more remote computers, such as remote computer(s) 2238. The remote computer(s) 2238 can be a personal computer, a server, a router, a network PC, a workstation, a microprocessor based appliance, a peer device, a smart phone, a tablet, or other network node, and typically includes many of the elements described relative to computer 2202. For purposes of brevity, only a memory storage device 2240 is illustrated with remote computer(s) 2238. Remote computer(s) 2238 is logically connected to computer 2202 through a network interface 2242 and then connected via communication connection(s) 2244. Network interface 2242 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2244 refers to the hardware/software employed to connect the network interface 2242 to the bus 2208. While communication connection 2244 is shown for illustrative clarity inside computer 2202, it can also be external to computer 2202. The hardware/ software necessary for connection to the network interface 2242 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 23:
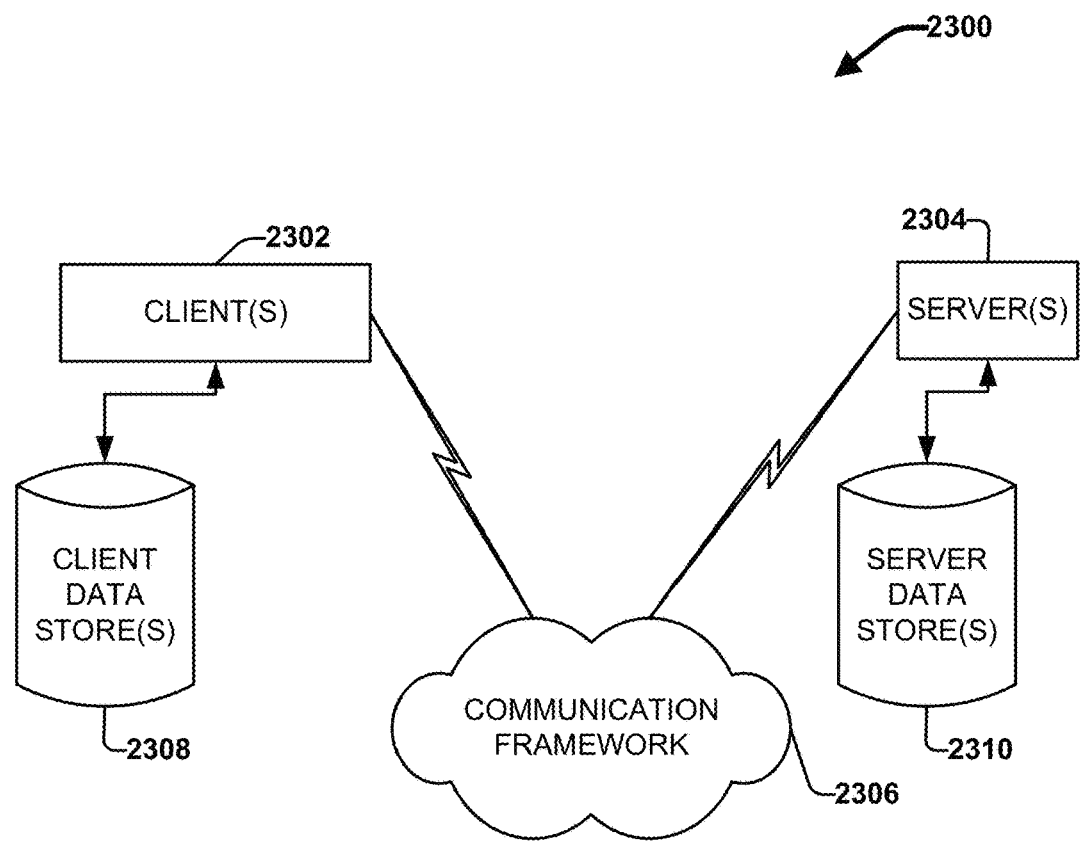
FIG. 23 illustrates a block diagram of another example, non-limiting operating environment in which one or more embodiments described herein can be facilitated.

Referring to FIG. 23, there is illustrated a schematic block diagram of a computing environment 2300 in accordance with this disclosure in which the subject systems (e.g., system 100, the like), methods and computer readable media can be deployed. The computing environment 2300 includes one or more client(s) 2302 (e.g., laptops, smart phones, PDAs, media players, computers, portable electronic devices, tablets, and the like). The client(s) 2302 can be hardware and/or software (e.g., threads, processes, computing devices). The computing environment 2300 also includes one or more server(s) 2304. The server(s) 2304 can also be hardware or hardware in combination with software (e.g., threads, processes, computing devices). The servers 2304 can house threads to perform transformations by employing aspects of this disclosure, for example. In various embodiments, one or more components, devices, systems, or subsystems of system 100 and/or system 200 can be deployed as hardware and/or software at a client 2302 and/or as hardware and/or software deployed at a server 2304. One possible communication between a client 2302 and a server 2304 can be in the form of a data packet transmitted between two or more computer processes wherein the data packet may include healthcare related data, training data, AI models, input data for the AI models and the like. The data packet can include a metadata, e.g., associated contextual information, for example. The computing environment 2300 includes a communication framework 2306 (e.g., a global communication network such as the Internet, or mobile network(s)) that can be employed to facilitate communications between the client(s) 2302 and the server(s) 2304.

Communications can be facilitated via a wired (including optical fiber) and/or wireless technology. The client(s) 2302 include or are operatively connected to one or more client data store(s) 2308 that can be employed to store information local to the client(s) 2302 (e.g., associated contextual information). Similarly, the server(s) 2304 are operatively include or are operatively connected to one or more server data store(s) 2310 that can be employed to store information local to the servers 2304 (e.g., application data).

In one embodiment, a client 2302 can transfer an encoded file, in accordance with the disclosed subject matter, to server 2304. Server 2304 can store the file, decode the file, or transmit the file to another client 2302. It is to be appreciated, that a client 2302 can also transfer uncompressed file to a server 2304 and server 2304 can compress the file in accordance with the disclosed subject matter. Likewise, server 2304 can encode video information and transmit the information via communication framework 2306 to one or more clients 2302.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a tracking component that, employs one or more sensors, to track respective real-time movements of battery electric vehicles in a fleet of rental vehicles;
        a vehicle status component that, in real-time:
            remotely connects to respective electronic control units of the battery electric vehicles,
            remotely controls, using the remote connections, the respective electronic control units to determine respective real-time current charge levels of the battery electric vehicles, and
            in response to determining that a real-time current charge level of a battery electric vehicle of the battery electric vehicles, is below a defined threshold, remotely controls using the remote connection, the electronic control unit of the battery electric vehicle to drive the battery electric vehicle to a defined charging station;
        a charge forecasting component that determines respective forecasted charge levels of the battery electric vehicles at one or more defined future times based on the respective real-time movements of the battery electric vehicles, the respective real-time current charge levels of the battery electric vehicles, and respective existing rental agreements for the battery electric vehicles; and
        a booking component that controls renting of the battery electric vehicles for the one or more defined future times based on the respective forecasted charge levels.

2. The system of claim 1, wherein the charge forecasting component determines the respective forecasted charge levels based further on respective renter profile data of renters specified in the respective existing rental agreements.

3. The system of claim 1, wherein the charge forecasting component determines the respective forecasted charge levels based further on durations of the respective existing rental agreements.

4. The system of claim 1, wherein the charge forecasting component determines the respective forecasted charge levels based further on respective durations of charging periods of the battery electric vehicles following completion of the respective existing rental agreements.

5. The system of claim 4, wherein the charge forecasting component determines the respective forecasted charge levels based further on respective types of charging stations used for the charging periods.

6. The system of claim 4, wherein the charge forecasting component determines the respective forecasted charge levels based further on respective numbers of battery electric vehicles sharing same charging stations used for the charging periods.

7. The system of claim 1, wherein the charge forecasting component determines the respective forecasted charge levels based further on respective expected charge levels of the battery electric vehicles following completion of the respective existing rental agreements.

8. The system of claim 7, wherein the charge forecasting component determines the respective expected charge levels based on respective known battery consumption rates of the battery electric vehicles and durations of the respective existing rental agreements.

9. The system of claim 7, wherein the charge forecasting component determines the respective expected charge levels based on weather conditions associated with the respective existing rental agreements.

10. The system of claim 1, wherein the booking component prevents booking a future rental agreement for a battery electric vehicle of the battery electric vehicles based on a determination that a forecasted charge level of the battery electric vehicle at a time of initiation of the future rental agreement is less than a minimum charge level required for the future rental agreement.

11. The system of claim 1, wherein the computer executable components further comprise:
a scheduling component that identifies one or more battery electric vehicles of the battery electric vehicles that have respective forecasted charge levels at a time of initiation of a future rental agreement for usage of one of the battery electric vehicles that satisfies a minimum charge level required for the future rental agreement.

12. The system of claim 11, wherein the computer executable components further comprise:
a recommendation component that provides a recommendation identifying the one or more battery electric vehicles as candidate rental vehicles to an entity requesting booking of the future rental agreement.

13. A method, comprising:
tracking, by a system operatively coupled to a processor, using one or more sensors, respective real-time movements of battery electric vehicles in a fleet of rental vehicles; and;
remotely connecting, by the system, to respective electronic control units of the battery electric vehicles;
remotely controlling, by the system, the respective electronic control units to determine respective real-time current charge levels of the battery electric vehicles;
in response to determining that a real-time current charge level of a battery electric vehicle of the battery electric vehicles, is below a defined threshold, remotely controlling, by the system, using the remote connection, the electronic control unit of the battery electric vehicle to drive the battery electric vehicle to a defined charging station;
determining, by the system, respective forecasted charge levels of the battery electric vehicles at one or more defined future times based on the respective real-time movements of the battery electric vehicles, the respective real-time current charge levels of the battery electric vehicles, and respective existing rental agreements for the battery electric vehicles; and
controlling, by the system, renting of the battery electric vehicles for the one or more defined future times based on the respective forecasted charge levels.

14. The method of claim 13, wherein the determining comprises determining the respective forecasted charge levels based further on durations of the respective existing rental agreements for the battery electric vehicles.

15. The method of claim 13, wherein the determining comprises determining the respective forecasted charge levels based further on respective durations of charging periods of the battery electric vehicles following completion of the respective existing rental agreements.

16. The method of claim 13, further comprising:
preventing, by the system, scheduling a future rental agreement for a battery electric vehicle of the battery electric vehicles based on a determination that a forecasted charge level of the battery electric vehicle at a time of initiation of the future rental agreement is less than a minimum charge level required for the future rental agreement.

17. The method of claim 13, further comprising:
identifying, by the system, one or more battery electric vehicles of the battery electric vehicles that have respective forecasted charge levels at a time of initiation of a future rental agreement for usage of one of the battery electric vehicles that satisfies a minimum charge level required for the future rental agreement.

18. The method of claim 17, further comprising:
providing, by the system, a recommendation identifying the one or more battery electric vehicles as candidate rental vehicles to an entity requesting booking of the future rental agreement.

19. A non-transitory machine-readable medium, comprising executable instructions that, when executed by a processor, facilitate performance of operations, comprising:
tracking, using one or more sensors, respective real-time movements of battery electric vehicles in a fleet of rental vehicles, and
remotely connecting to respective electronic control units of the battery electric vehicles;
remotely controlling the respective electronic control units to determine respective real-time current charge levels of the battery electric vehicles;
in response to determining that a real-time current charge level of a battery electric vehicle of the battery electric vehicles, is below a defined threshold, remotely controlling, using the remote connection, the electronic control unit of the battery electric vehicle to drive the battery electric vehicle to a defined charging station;
determining respective forecasted charge levels of the battery electric vehicles at one or more defined future times based on the respective real-time movements of the battery electric vehicles, the respective real-time current charge levels of the battery electric vehicles, and respective existing rental agreements for the battery electric vehicles; and
controlling the renting of the battery electric vehicles for the one or more defined future times based on the respective forecasted charge levels.

20. The non-transitory machine-readable medium of claim 19, wherein the operations further comprise:
identifying one or more battery electric vehicles of the battery electric vehicles that have respective forecasted charge level at a time of initiation of a future rental agreement for usage of one of the battery electric vehicles that satisfies a minimum charge level required for the future rental agreement; and providing a recommendation identifying the one or more battery electric vehicles as candidate rental vehicles to an entity requesting booking of the future rental agreement.

* * * * *